US012812481B2

(12) United States Patent
Sharma et al.

(10) Patent No.: US 12,812,481 B2
(45) Date of Patent: Nov. 24, 2026

(54) MEASUREMENT TYPE TRANSITION CONFIGURATIONS

(71) Applicant: QUALCOMM Incorporated, San Diego, CA (US)

(72) Inventors: Prashant Sharma, San Jose, CA (US); Muhammad Nazmul Islam, Littleton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 1068 days.

(21) Appl. No.: 17/877,418

(22) Filed: Jul. 29, 2022

(65) Prior Publication Data

US 2024/0040446 A1 Feb. 1, 2024

(51) Int. Cl.
*H04W 36/00* (2009.01)

(52) U.S. Cl.
CPC ................................ *H04W 36/0061* (2013.01)

(58) Field of Classification Search
CPC ................................................. H04W 36/0061
See application file for complete search history.

(56) References Cited

U.S. PATENT DOCUMENTS

2019/0239106 A1* 8/2019 Cui ....................... H04W 24/08
2022/0158793 A1* 5/2022 Selvaganapathy ........................... H04L 27/2602
2023/0224777 A1* 7/2023 Raghavan ............. H04W 36/06
2024/0196173 A1* 6/2024 Chen ................... H04W 72/121
2025/0071680 A1* 2/2025 Zhou ................... H04W 72/232

FOREIGN PATENT DOCUMENTS

CN 109923919 B * 6/2023 ........ H04W 72/0453
CN 117693961 A * 3/2024 ........... H04L 5/0094
WO WO-2020060950 A1 3/2020

(Continued)

OTHER PUBLICATIONS

3GPP TS 38.133: “3rd Generation Partnership Project, Technical Specification Group Radio Access Network, NR, Requirements for Support of Radio Resource Management (Release 17)”, 3GPP Standard, Technical Specification, 3rd Generation Partnership Project, Mobile Competence Centre, 650, Route Des Lucioles, F-06921 Sophia-Antipolis Cedex, France, vol. RAN WG4, No. V17.6.0, Jun. 30, 2022, 824 Pages, XP052183551, pp. 82-904, Para [0009].

(Continued)

*Primary Examiner* — Saad A. Waqas
(74) *Attorney, Agent, or Firm* — Holland & Hart, LLP

(57) ABSTRACT

Methods, systems, and devices for wireless communications are described. The network may configure a user equipment (UE) with measurement objects indicating the synchronization signal blocks (SSB)s to be measured for neighbor cells. A UE may receive control signaling from the network indicating a switch from a first bandwidth part (BWP) to a second BWP. The first BWP may be associated with a first cell measurement type for neighbor cells (e.g., inter-frequency or intra-frequency) and a first reference SSB. The second BWP may be associated with a second, different, cell measurement type for neighbor cells and a second, different, reference SSB. After the BWP switch, the UE may perform measurements on SSBs associated with neighbor cells based on the second cell measurement type.

27 Claims, 17 Drawing Sheets

(56) References Cited

FOREIGN PATENT DOCUMENTS

| | | | | | |
|---|---|---|---|---|---|
| WO | WO-2020248261 A1 | * | 12/2020 | ........ | H04W 36/0094 |
| WO | WO-2022076873 A1 | * | 4/2022 | ........ | H04W 36/0072 |

OTHER PUBLICATIONS

CMCC: "On RedCap Measurement Procedure", 3GPP TSG-RAN WG4 Meeting# 103-e, R4-2208395, 3rd Generation Partnership Project, Mobile Competence Centre, 650, Route Des Lucioles, F-06921 Sophia-Antipolis Cedex, France, vol. RAN WG4, No. Electronic Meeting, May 9, 2022-May 20, 2022, Apr. 25, 2022, 16 Pages, XP052139897, The whole document.

International Search Report and Written Opinion—PCT/US2023/026996—ISA/EPO—Oct. 20, 2023.

Qualcomm Incorporated: "Measurement Procedures for RedCap UEs", 3GPP TSG-RAN WG4 Meeting #104-e, R4-2214075, 3rd Generation Partnership Project, Mobile Competence Centre, 650, Route Des Lucioles, F-06921 Sophia-Antipolis Cedex, France, vol. RAN WG4, No. Electronic Meeting, Aug. 15, 2022-Aug. 26, 2022, Aug. 10, 2022, 3 Pages, XP052282703, The whole document.

* cited by examiner

MEASUREMENT TYPE TRANSITION CONFIGURATIONS

INTRODUCTION

The following relates to wireless communications relating to measurement type transition configurations. Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support measurement type transition configurations. For example, the described techniques provide for determining which measurement type for neighbor cell measurements to apply after a bandwidth part (BWP) switch. For example, the network may configure a user equipment (UE) with measurement objects indicating the synchronization signal blocks (SSB)s to be measured for neighbor cells. A measurement for a neighbor cell may be referred to as an intra-frequency measurement if the center frequency of an SSB for the serving cell is the same as the center frequency of the SSB for the neighbor cell, and the subcarrier spacing (SCS) for the two SSBs is the same. Measurements that are not intra-frequency may be referred to as inter-frequency measurements. A UE may receive control signaling from the network (e.g., a serving network entity) indicating a switch from a first BWP to a second BWP. The first BWP may be associated with a first cell measurement type for neighbor cells (e.g., inter-frequency or intra-frequency) and a first reference SSB. The second BWP may be associated with a second, different, cell measurement type for neighbor cells and a second, different, reference SSB. After the BWP switch, the UE may perform measurements on SSBs associated with neighbor cells based on the second cell measurement type. For example, if the BWP switch results in the measurements on the neighbor cells switching from inter-frequency measurements to intra-frequency measurements, the UE may apply an intra-frequency measurement type, and associated measurement parameters, to the cell measurements after the BWP switch.

A method for wireless communications at a first network node is described. The method may include receiving, from a second network node, control signaling including an indication for the first network node to switch from a first active BWP associated with a first neighbor cell measurement type to a second active BWP, where the first neighbor cell measurement type is associated with a first reference SSB, generating first measurement information corresponding to a first quantity of SSBs associated with a first quantity of neighbor cells in accordance with a second neighbor cell measurement type, where the second neighbor cell measurement type is based on the second active BWP, where the second neighbor cell measurement type is associated with a second reference SSB, and transmitting, to the second network node, the first measurement information.

A first network node for wireless communications is described. The first network node may include memory and at least one processor coupled to the memory. The at least one processor may be configured to receive, from a second network node, control signaling including an indication for the first network node to switch from a first active BWP associated with a first neighbor cell measurement type to a second active BWP, where the first neighbor cell measurement type is associated with a first reference SSB, generate first measurement information corresponding to a first quantity of SSBs associated with a first quantity of neighbor cells in accordance with a second neighbor cell measurement type, where the second neighbor cell measurement type is based on the second active BWP, where the second neighbor cell measurement type is associated with a second reference SSB, and transmit, to the second network node, the first measurement information.

Another apparatus for wireless communications at a first network node is described. The apparatus may include means for receiving, from a second network node, control signaling including an indication for the first network node to switch from a first active BWP associated with a first neighbor cell measurement type to a second active BWP, where the first neighbor cell measurement type is associated with a first reference SSB, means for generating first measurement information corresponding to a first quantity of SSBs associated with a first quantity of neighbor cells in accordance with a second neighbor cell measurement type, where the second neighbor cell measurement type is based on the second active BWP, where the second neighbor cell measurement type is associated with a second reference SSB, and means for transmitting, to the second network node, the first measurement information.

A non-transitory computer-readable medium storing code for wireless communications at a first network node is described. The code may include instructions executable by a processor to receive, from a second network node, control signaling including an indication for the first network node to switch from a first active BWP associated with a first neighbor cell measurement type to a second active BWP, where the first neighbor cell measurement type is associated with a first reference SSB, generate first measurement information corresponding to a first quantity of SSBs associated with a first quantity of neighbor cells in accordance with a second neighbor cell measurement type, where the second neighbor cell measurement type is based on the second active BWP, where the second neighbor cell measurement type is associated with a second reference SSB, and transmit, to the second network node, the first measurement information.

In some examples of the method, apparatuses, and non-transitory computer-readable medium described herein, the first quantity of SSBs and the first quantity of neighbor cells may be based on a center frequency of the second reference SSB and a frequency layer associated with the first quantity of SSBs.

Some examples of the method, apparatuses, and non-transitory computer-readable medium described herein may further include operations, features, means, or instructions for determining, the first quantity of neighbor cells from a second quantity of neighbor cells, where a second quantity of neighbor cells associated with the first neighbor cell measurement type may be greater than the first quantity of neighbor cells, the determining based on second measurement information corresponding to of the second quantity of neighbor cells.

In some examples of the method, apparatuses, and non-transitory computer-readable medium described herein, a second quantity of neighbor cells associated with the first neighbor cell measurement type may be greater than the first quantity of neighbor cells and the control signaling includes an indication of cells included in the first quantity of neighbor cells.

Some examples of the method, apparatuses, and non-transitory computer-readable medium described herein may further include operations, features, means, or instructions for determining the first quantity of SSBs independently of a quantity of configured radio link management reference signal SSBs, where a center frequency of the second reference SSB may be outside of the second active BWP, where the SSBs of the first quantity of SSBs may have the center frequency.

Some examples of the method, apparatuses, and non-transitory computer-readable medium described herein may further include operations, features, means, or instructions for generating during a period between reception of the control signaling and generation of first measurement information, second measurement information corresponding to a lesser of the first quantity of SSBs or a second quantity of SSBs, where the first neighbor cell measurement type may be associated with the second quantity of SSBs and a second quantity of neighbor cells, where the second neighbor cell measurement type may be associated with the first quantity of SSBs and the first quantity of neighbor cells.

In some examples of the method, apparatuses, and non-transitory computer-readable medium described herein, the control signaling includes an indication of the period.

Some examples of the method, apparatuses, and non-transitory computer-readable medium described herein may further include operations, features, means, or instructions for receiving, from the second network node, second control signaling including an indication for the first network node to perform a set of measurements for a first cell in accordance with the first neighbor cell measurement type, generating, prior to reception of the control signaling, second measurement information corresponding to a subset of measurements of the set of measurements in accordance with the first neighbor cell measurement type, and generating, after the reception of the control signaling, third measurement information corresponding to the set of measurements in accordance with the second neighbor cell measurement type.

In some examples of the method, apparatuses, and non-transitory computer-readable medium described herein, generating the first measurement information may include operations, features, means, or instructions for generating the first measurement information in accordance with a first delay parameter, where the first neighbor cell measurement type may be associated with the first delay parameter greater than a second delay parameter associated with the second neighbor cell measurement type.

Some examples of the method, apparatuses, and non-transitory computer-readable medium described herein may further include operations, features, means, or instructions for receiving, from the second network node, second control signaling including an indication for the first network node to perform a set of measurements for a first cell in accordance with the first neighbor cell measurement type, generating, prior to reception of the control signaling, second measurement information corresponding to a subset of measurements of the set of measurements in accordance with the first neighbor cell measurement type, and generating, after reception of the control signaling, third measurement information corresponding to a remainder of the set of measurements in accordance with the second neighbor cell measurement type.

A method for wireless communications is described. The method may include transmitting, to a second network node, control signaling including an indication for the second network node to switch from a first active BWP associated with a first neighbor cell measurement type to a second active BWP, where the first neighbor cell measurement type is associated with a first reference SSB, transmitting a first quantity of SSBs associated with a first quantity of neighbor cells via the first quantity of neighbor cells, and receiving, from the second network node, a first measurement information corresponding to the first quantity of SSBs in accordance with a second neighbor cell measurement type associated with the second active BWP, where the second neighbor cell measurement type is associated with a second reference SSB.

A first network node for wireless communications is described. The first network node may include memory and at least one processor coupled to the memory. The at least one processor may be configured to transmit, to a second network node, control signaling including an indication for the second network node to switch from a first active BWP associated with a first neighbor cell measurement type to a second active BWP, where the first neighbor cell measurement type is associated with a first reference SSB, transmit a first quantity of SSBs associated with a first quantity of neighbor cells via the first quantity of neighbor cells, and receive, from the second network node, a first measurement information corresponding to the first quantity of SSBs in accordance with a second neighbor cell measurement type associated with the second active BWP, where the second neighbor cell measurement type is associated with a second reference SSB.

Another apparatus for wireless communications is described. The apparatus may include means for transmitting, to a second network node, control signaling including an indication for the second network node to switch from a first active BWP associated with a first neighbor cell measurement type to a second active BWP, where the first neighbor cell measurement type is associated with a first reference SSB, means for transmitting a first quantity of SSBs associated with a first quantity of neighbor cells via the first quantity of neighbor cells, and means for receiving, from the second network node, a first measurement information corresponding to the first quantity of SSBs in accordance with a second neighbor cell measurement type associated with the second active BWP, where the second neighbor cell measurement type is associated with a second reference SSB.

A non-transitory computer-readable medium storing code for wireless communications is described. The code may include instructions executable by a processor to transmit, to a second network node, control signaling including an indication for the second network node to switch from a first active BWP associated with a first neighbor cell measurement type to a second active BWP, where the first neighbor cell measurement type is associated with a first reference SSB, transmit a first quantity of SSBs associated with a first quantity of neighbor cells via the first quantity of neighbor cells, and receive, from the second network node, a first measurement information corresponding to the first quantity of SSBs in accordance with a second neighbor cell measurement type associated with the second active BWP, where the second neighbor cell measurement type is associated with a second reference SSB.

In some examples of the method, apparatuses, and non-transitory computer-readable medium described herein, the first quantity of SSBs and the first quantity of neighbor cells may be based on a center frequency of the second reference SSB and a frequency layer associated with the first quantity of SSBs.

In some examples of the method, apparatuses, and non-transitory computer-readable medium described herein, a second quantity of neighbor cells associated with the first neighbor cell measurement type may be greater than the first quantity of neighbor cells and the control signaling includes an indication of cells included in the first quantity of neighbor cells.

In some examples of the method, apparatuses, and non-transitory computer-readable medium described herein, a center frequency of the second reference SSB may be outside of the second active BWP, the SSBs of the first quantity of SSBs may have the center frequency, and the first quantity of SSBs may be independent of a quantity of configured radio link management reference signal SSBs.

Some examples of the method, apparatuses, and non-transitory computer-readable medium described herein may further include operations, features, means, or instructions for receiving from the second network node, an indication of second measurement information at the second network node during a period between transmission of the control signaling and a generation of the first measurement information at the second network node, where the first neighbor cell measurement type may be associated with a second quantity of SSBs and a second quantity of neighbor cells, where the second neighbor cell measurement type may be associated with the first quantity of SSBs and the first quantity of neighbor cells, and where the second measurement information corresponds to a lesser of the first quantity of SSBs or the second quantity of SSBs.

In some examples of the method, apparatuses, and non-transitory computer-readable medium described herein, the control signaling includes an indication of the period.

Some examples of the method, apparatuses, and non-transitory computer-readable medium described herein may further include operations, features, means, or instructions for transmitting, to the second network node and prior to the control signaling, second control signaling including an indication for the second network node to perform a set of measurements for a first cell in accordance with the first neighbor cell measurement type and receiving, from the second network node, second measurement information corresponding to the set of measurements, where the set of measurements may be associated with the second neighbor cell measurement type.

In some examples of the method, apparatuses, and non-transitory computer-readable medium described herein, the first neighbor cell measurement type may be associated with a first delay parameter greater than a second delay parameter associated with the second neighbor cell measurement type and the set of measurements may be associated with the first delay parameter.

Some examples of the method, apparatuses, and non-transitory computer-readable medium described herein may further include operations, features, means, or instructions for transmitting, to the second network node and prior to the control signaling, second control signaling including an indication for the second network node to perform a set of measurements for a first cell in accordance with the first neighbor cell measurement type and receiving, from the second network node, second measurement information corresponding to the set of measurements, where a subset of the set of measurements prior to the control signaling may be associated with the first neighbor cell measurement type, and a remainder of the set of measurements may be associated with the second neighbor cell measurement type.

DETAILED DESCRIPTION

Figure 1:
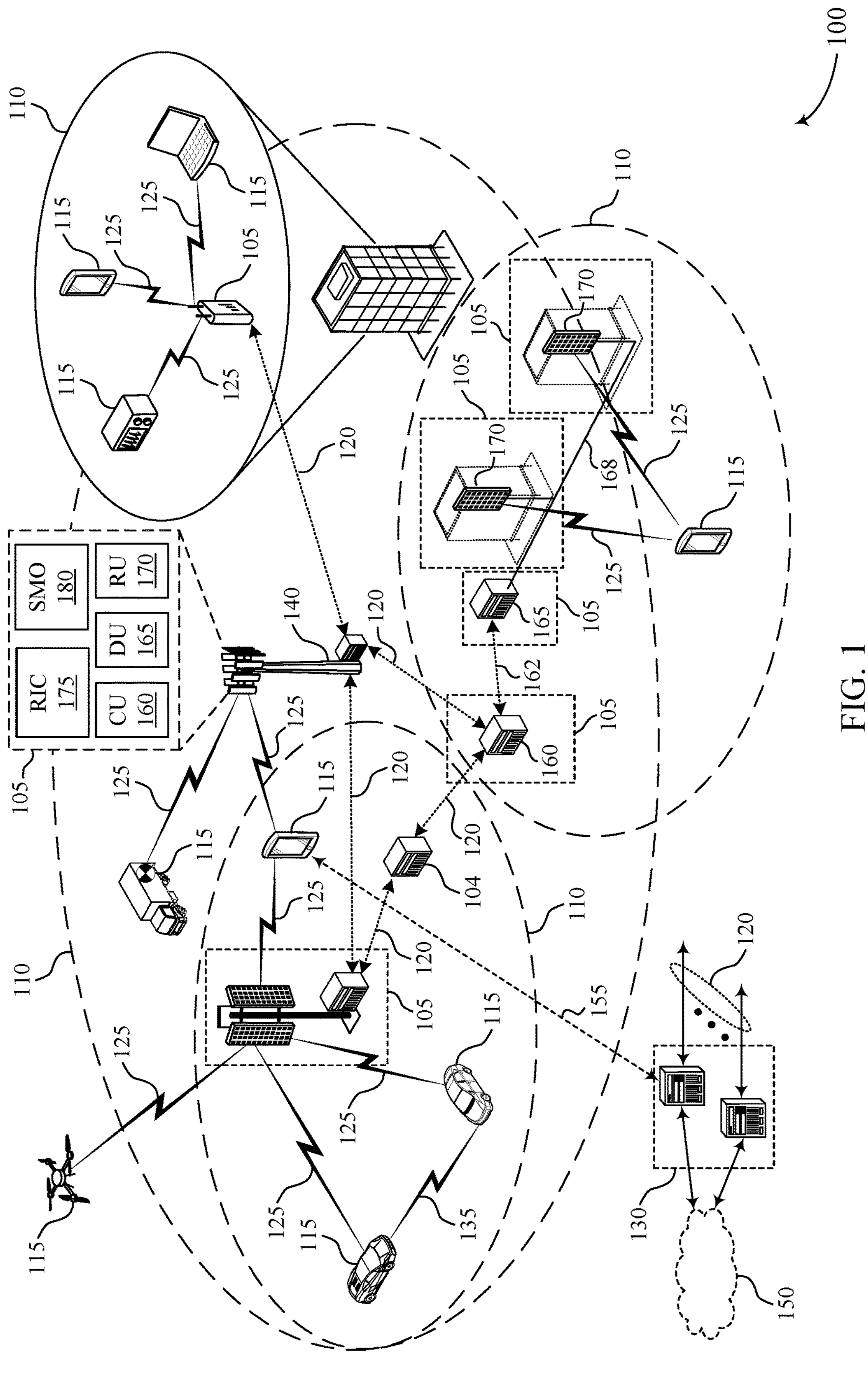
FIG. 1 illustrates an example of a wireless communications system that supports measurement type transition configurations in accordance with one or more aspects of the present disclosure.

In some wireless communications systems, a user equipment (UE) connected to a serving cell may perform intra-frequency or inter-frequency measurements on neighbor cells for mobility purposes such as cell reselection and handover. For example, the network may configure a UE with measurement objects indicating the synchronization signal blocks (SSB)s to be measured for neighbor cells. A measurement for a neighbor cell may be referred to as an intra-frequency measurement if the center frequency of an SSB for the serving cell is the same as the center frequency of the SSB for the neighbor cell, and the subcarrier spacing (SCS) for the two SSBs is the same. Measurements that are not intra-frequency may be referred to as inter-frequency measurements. Inter-frequency and intra-frequency measurements may be associated with differing parameters. For example, a UE may perform more intra-frequency cell measurements than inter-frequency cell measurements. Other parameters that may be different between intra-frequency cell measurements and inter-frequency measurements may include measurement delays and reporting delays. For example, an inter frequency measurement may demand more SSB samples (e.g., 8 SSB samples) for a primary synchronization signal (PSS) or secondary synchronization signal (SSS) detection as compared to an intra-frequency measurement (e.g., 5 SSB samples). The SSB for the serving cell (e.g., the reference SSB), may be defined or identified based on the active bandwidth part (BWP) for the UE. Accordingly, when the active BWP for a UE changes, the reference SSB may change. If the reference SSB changes, neighbor cell measurements may switch from intra-frequency to inter-frequency measurements, or vice versa. There are currently no defined rules, however, for which measurement types to apply after a BWP switch changes configured measurements from intra-frequency to inter-frequency measurements, or vice versa.

Aspects of the present disclosure relate to techniques for determining which measurement type for neighbor cell measurements to apply after a BWP switch. A UE may receive control signaling from the network (e.g., a serving network entity) indicating a switch from a first BWP to a second BWP. The first BWP may be associated with a first cell measurement type for neighbor cells (e.g., inter-frequency or intra-frequency) and a first reference SSB. The second BWP may be associated with a second, different, cell measurement type for neighbor cells and a second, different, reference SSB. After the BWP switch, the UE may perform measurements on SSBs associated with neighbor cells based on the second cell measurement type. For example, if the BWP switch results in the measurements on the neighbor cells switching from inter-frequency measurements to intra-frequency measurements, the UE may apply an intra-frequency measurement type, and associated measurement parameters, to the cell measurements after the BWP switch. Rules regarding which measurement parameters to apply during transition periods after the switch is signaled or to previously initiated cell measurements may further be defined or signaled by the network.

Aspects of the disclosure are initially described in the context of wireless communications systems. Aspects of the disclosure are further illustrated by and described with reference to timing diagrams, process flows, apparatus diagrams, system diagrams, and flowcharts that relate to measurement type transition configurations.

FIG. 1 illustrates an example of a wireless communications system 100 that supports measurement type transition configurations in accordance with one or more aspects of the present disclosure. The wireless communications system 100 may include one or more network entities 105, one or more UEs 115, and a core network 130. In some aspects, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various aspects, a network entity 105 may be referred to as a network element, a mobility element, a radio access network (RAN) node, or network equipment, among other nomenclature. In some aspects, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node (which may be referred to as a node, a network node, a network entity, or a wireless node) may include, be, or be included in (e.g., be a component of) a base station (e.g., any base station described herein), a UE 115 (e.g., any UE 115 described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE 115. As another example, a network node may be a base station or network entity. As another example, a first network node may be configured to communicate with a second network node or a third network node. In one aspect of this example, the first network node may be a UE 115, the second network node may be a base station, and the third network node may be a UE 115. In another aspect of this example, the first network node may be a UE 115, the second network node may be a base station, and the third network node may be a base station. In yet other aspects of this example, the first, second, and third network nodes may be different relative to these examples. Similarly, reference to a UE 115, base station, apparatus, device, computing system, or the like may include disclosure of the UE 115, base station, apparatus, device, computing system, or the like being a network node. For example, disclosure that a UE 115 is configured to receive information from a base station also discloses that a first network node is configured to receive information from a second network node. Consistent with this disclosure, once a specific example is broadened in accordance with this disclosure (e.g., a UE 115 is configured to receive information from a base station also discloses that a first network node is configured to receive information from a second network node), the broader example of the narrower example may be interpreted in the reverse, but in a broad open-ended way. In the example above where a UE 115 is configured to receive information from a base station also discloses that a first network node is configured to receive information from a second network node, the first network node may refer to a first UE 115, a first base station, a first apparatus, a first device, a first computing system, a first set of one or more one or more components, a first processing entity, or the like configured to receive the information; and the second network node may refer to a second UE 115, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some aspects, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some aspects, network entities 105 may communicate with one another via a backhaul communication link 120 (e.g., in accordance with an X2, Xn, or other interface protocol) either directly (e.g., directly between network entities 105) or indirectly (e.g., via a core network 130). In some aspects, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other aspects or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some aspects, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some aspects, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an IAB network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a CU 160, a DU 165, an RU 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), an RRU, or a transmission reception point (TRP). One or more components of the network entities 105 in a disaggregated RAN architecture may be co-located, or one or more components of the network entities 105 may be located in distributed locations (e.g., separate physical locations). In some aspects, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some aspects, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some aspects, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some aspects, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support measurement type transition configurations as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some aspects, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some aspects, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some aspects, the wireless communications system 100 may include network entities 105 or UEs 115 that support concurrent communications using carriers associated with multiple carrier bandwidths. In some aspects, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some aspects, a UE 115 may be configured with multiple BWPs. In some aspects, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some aspects, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some aspects, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some aspects, a carrier may support multiple cells, and different cells may be configured according to different protocol types (e.g., MTC, narrowband IoT (NB-IoT), enhanced mobile broadband (eMBB)) that may provide access for different types of devices.

In some aspects, a network entity 105 (e.g., a base station 140, an RU 170) may be movable and therefore provide communication coverage for a moving coverage area 110. In some aspects, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some aspects, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some aspects, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some aspects, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications.

The terms ultra-reliable, low-latency, and ultra-reliable low-latency may be used interchangeably herein.

In some aspects, a UE 115 may be configured to support communicating directly with other UEs 115 via a device-to-device (D2D) communication link 135 (e.g., in accordance with a peer-to-peer (P2P), D2D, or sidelink protocol). In some aspects, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some aspects, one or more UEs 115 of such a group may be outside the coverage area 110 of a network entity 105 or may be otherwise unable to or not configured to receive transmissions from a network entity 105. In some aspects, groups of the UEs 115 communicating via D2D communications may support a one-to-many (1:M) system in which each UE 115 transmits to each of the other UEs 115 in the group. In some aspects, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some aspects, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some aspects, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some aspects, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some aspects, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some aspects, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some aspects, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some aspects, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some aspects, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some aspects, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some aspects, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In the wireless communications system 100, a UE 115 connected to a serving cell may perform intra-frequency or inter-frequency measurements on neighbor cells for mobility purposes such as cell reselection and handover. For example, a network entity 105 may configure a UE 115 with measurement objects indicating the SSBs to be measured for neighbor cells. Inter-frequency and intra-frequency measurements may be associated with differing parameters. The SSB for the serving cell (e.g., the reference SSB), may be defined or identified based on the active BWP for the UE.

The UE 115 may determine which measurement type for neighbor cell measurements to apply after a BWP switch. The UE 115 may receive control signaling from a network entity 105 indicating a switch from a first BWP to a second BWP. The first BWP may be associated with a first cell measurement type for neighbor cells (e.g., inter-frequency or intra-frequency) and a first reference SSB. The second BWP may be associated with a second, different, cell measurement type for neighbor cells and a second, different, reference SSB. After the BWP switch, the UE 115 may perform measurements on SSBs associated with neighbor cells based on the second cell measurement type. For example, if the BWP switch results in the measurements on the neighbor cells switching from inter-frequency measurements to intra-frequency measurements, the UE 115 may apply an intra-frequency measurement type, and associated measurement parameters, to the cell measurements after the BWP switch. Rules regarding which measurement parameters to apply during transition periods after the switch is signaled or to previously initiated cell measurements may further be defined or signaled by the network.

Figure 2:
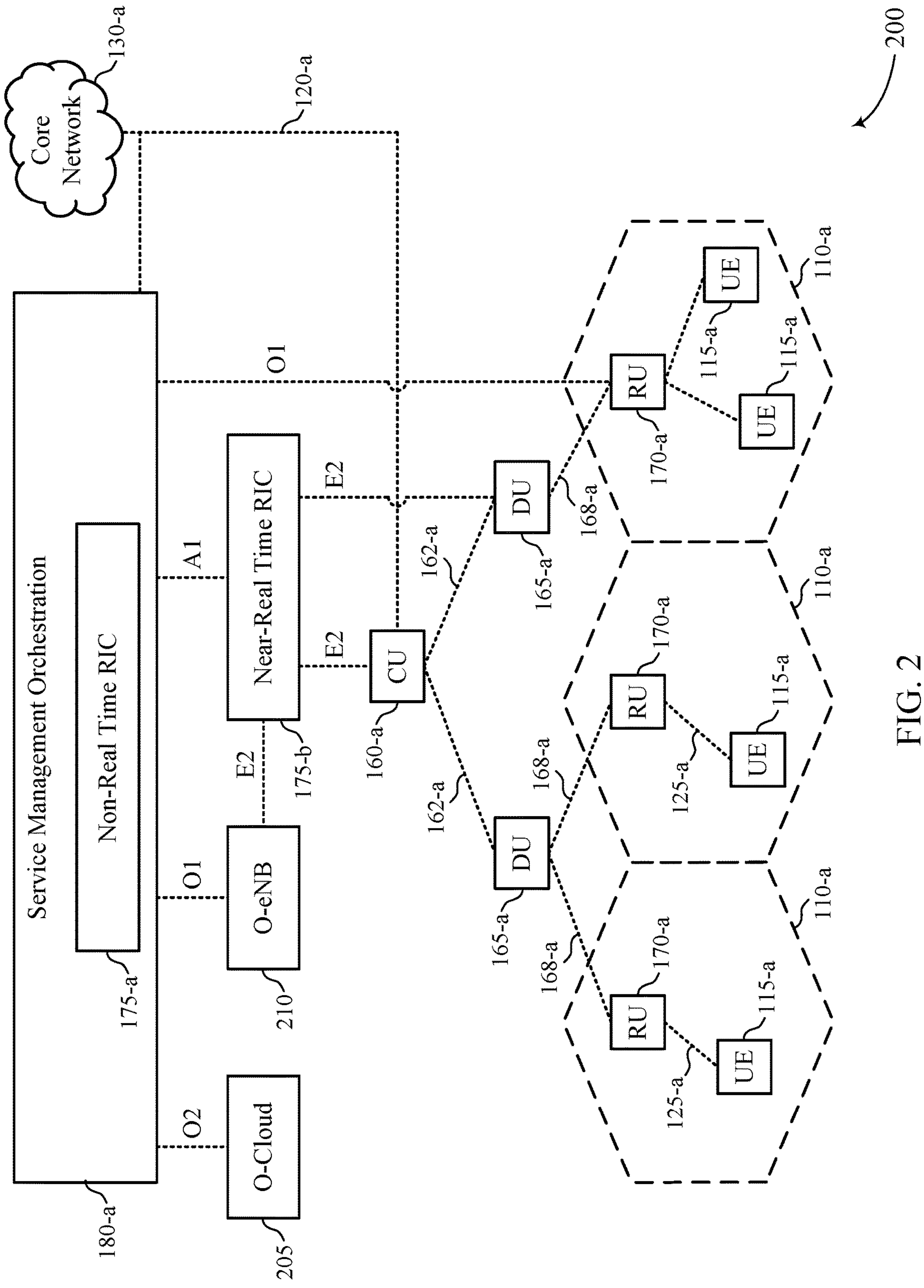
FIG. 2 illustrates an example of a network architecture that supports measurement type transition configurations in accordance with one or more aspects of the present disclosure.

FIG. 2 illustrates an example of a network architecture 200 (e.g., a disaggregated base station architecture, a disaggregated RAN architecture) that supports measurement type transition configurations in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some aspects, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some aspects, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some aspects, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) based on a functional split, such as those defined by the 3rd Generation Partnership Project (3GPP). In some aspects, a DU 165-*a* may further host one or more low PHY layers. Each layer may be implemented with an interface configured to communicate signals with other layers hosted by the DU 165-*a*, or with control functions hosted by a CU 160-*a*.

In some aspects, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some aspects, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some aspects, to generate AI/ML models to be deployed in the Near-RT MC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some aspects, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

Figure 3:
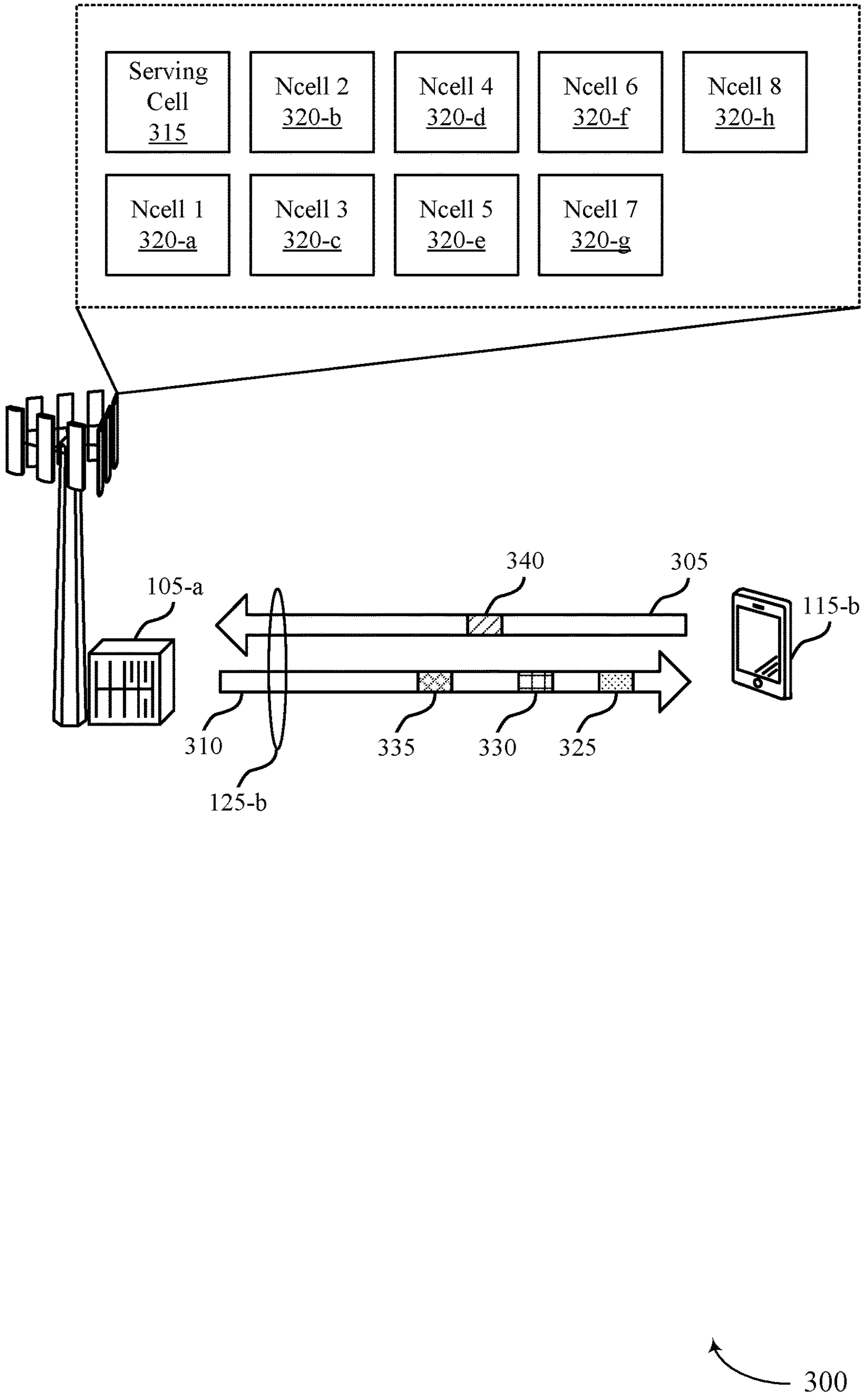
FIG. 3 illustrates an example of a wireless communications system that supports measurement type transition configurations in accordance with one or more aspects of the present disclosure.

FIG. 3 illustrates an example of a wireless communications system 300 that supports measurement type transition configurations in accordance with one or more aspects of the present disclosure. The wireless communications system 300 may implement aspects of wireless communications system 100. The wireless communications system 300 may include a UE 115-*b*, which may be an example of a UE 115 as described herein. The wireless communications system 300 may include a network entity 105-*a*, which may be an example of a network entity 105 as described herein.

The UE 115-*b* may communicate with the network entity 105-*a* using a communication link 125-*b*, which may be an example of an NR or LTE link between the UE 115-*a* and the network entity 105-*a*. The communication link 125-*b* may include a bi-directional link that enables both uplink and downlink communication. For example, the UE 115-*b* may transmit uplink transmissions 305, such as uplink control signals or uplink data signals, to the network entity 105-*a* using the communication link 125-*b* and the network entity 105-*a* may transmit downlink transmissions 310, such as downlink control signals or downlink data signals, to the UE 115-*b* using the communication link 125-*b*.

The UE 115-*b* may be connected with a serving cell 315 for a carrier. The UE 115-*b* may perform intra-frequency, inter-frequency, and/or inter-RAT neighbor cell measurements for mobility purposes such as cell-reselection and/or handover. For a given neighbor cell (e.g., the first neighbor cell 320-*a*, the second neighbor cell 320-*b*, the third neighbor cell 320-*c*, the fourth neighbor cell 320-*d*, the fifth neighbor cell 320-*e*, the sixth neighbor cell 320-*f*, the seventh neighbor cell 320-*g* or the eighth neighbor cell 320-*h*), the network entity 105-*a* may configure the UE 115-*b* (e.g., via first control signaling 325) with measurement objects that indicate the reference signal (e.g., the SSB) to be measured for a given neighbor cell. The network entity 105-*a* may transmit SSBs 335 for the one or more neighbor cells. The UE 115-*b* may perform measurements on the SSBs 335 in accordance with the configured measurement objects. The UE 115-*b* may report measurement information for the SSBs 335 in accordance with the configured measurement objects in a report 340. Parameters for neighbor cell measurements may depend on (e.g., be different between) whether the neighbor cell measurements are intra-frequency, inter-frequency, or inter-RAT measurements. Example parameters include the number of neighbor cells and SSBs 335 to be measured, cell detection and measurement delays, and measurement reporting delays. The parameters may further be differentiated depending on whether a measurement gap (MG) is used to perform the neighbor cell measurements. A measurement gap may be used or may not be used depending on the UE capability and whether an SSB to be measured in present in the UE active BWP.

In some cases, the UE 115-*b* may be a reduced capability (RedCap) UE. RedCap UEs may be applied in cases such as wearables, industrial wireless sensor networks (IWSN)s, surveillance cameras, and low-end smartphones. The maximum bandwidth of a RedCap UE may be 20 MHz for the Frequency Range 1 (FR1) band and 100 MHz for the Frequency Range 2 (FR2) band. A RedCap UE may perform serving cell measurements for beam and cell mobility purposes based on reference signals such as SSBs. Serving cell measurements for layer 1 (L1) procedures such as radio link management (RLM), beam failure detection (BFD), and L1 reference signal received power (RSRP) may be based on the reference signals available in the active BWP of the UE 115-*b*. Because of the small device bandwidth, a RedCap UE may not have an active SSB within the active BWP for the RedCap UE. As a RedCap UE may have an operating bandwidth less than the bandwidth of a carrier, the RedCap UE may additionally be configured with a non-cell defining SSB (NCD-SSB) in the active BWP. For example, an NCD-SSB may not be centered within an operating bandwidth of a carrier. A cell-defining SSB (CD-SSB) may be centered within the operating bandwidth of a carrier. For a RedCap UE, more than one SSB may be indicated as the SSB of the serving cell. In some aspects, which SSB to be used as the reference SSB of the more than one SSBs of the serving cell may be preconfigured or signaled to the UE 115-*b* (e.g., in the first control signaling 325).

A BWP specific serving cell measurement object may be defined in a field in RRC (e.g., the first control signaling 325). For example, in the RRC field BWP-DownlinkDedicated, the SSB defined in the RRC field servingCellMO may be the reference SSB to be used for serving cell measurements when the UE 115-*b* is in the active BWP corresponding to BWP-DownlinkDedicated. If the field BWP-DownlinkDedicated is absent, the SSB defined in the RRC field servingCellMO under the RRC field ServingCellConfig may be the reference SSB to be used for serving cell measurements. The reference SSB may be used to define intra-frequency neighbor cell measurements.

As described herein, when a BWP-specific serving cell measurement object (e.g., in the field servingCellMO) is defined in the RRC field BWP-DownlinkDedicated, the SSB defined in the field servingCellMO may be the reference SSB to be used for serving cell measurements when the UE 115-*b* is in the active BWP corresponding to BWP-DownlinkDedicated. Accordingly, the reference SSB to define intra-frequency measurements is associated with the UE active BWP. When the UE 115-*b* switches the active BWP (e.g., based on receiving second control signaling 330 from the network entity 105-*a* triggering the active BWP switch), the reference SSB may change. Accordingly, the neighbor cell measurement type may change from intra-frequency to inter-frequency, and vice versa, when the reference SSB changes. Additionally, whether an MG should be used to perform the measurements may also change (e.g., based on whether the reference SSB is within the active BWP of the UE 115-*b*). Four types of neighbor cell measurements may include intra-frequency measurements without MG, intra-frequency measurements with MG, inter-frequency measurements without MG, and inter-frequency measurement with MG. The different measurement types may be associated with different parameters, as described herein.

For example, the UE 115-*b* may monitor different number of neighbor cells and SSBs depending on whether the measurements are inter-frequency or intra-frequency. For example, for intra-frequency, during each measurement period, the UE 115-*b* may perform measurements (e.g., RSRP, reference signal received quality (RSRQ), and/or signal to interference and noise ratio (SINR) measurements) on 8 identified neighbor cells (e.g., each of the first neighbor cell 320-*a*, the second neighbor cell 320-*b*, the third neighbor cell 320-*c*, the fourth neighbor cell 320-*d*, the fifth neighbor cell 320-*e*, the sixth neighbor cell 320-*f*, the seventh neighbor cell 320-*g*, or the eighth neighbor cell 320-*h*) and 14 SSBs with different SSB indices and/or PCIDs. In some aspects, the number of SSBs in the serving cell (except for the secondary cell (SCell)) may not be smaller than the number of configured RLM reference signal (RLM-RS) SSB resources. For inter-frequency measurements, during each measurement period, the UE 115-*b* may perform measurements (e.g., RSRP, RSRQ, and/or SINR measurements) on 4 neighbor cells (e.g., 4 of the first neighbor cell 320-*a*, the second neighbor cell 320-*b*, the third neighbor cell 320-*c*, the fourth neighbor cell 320-*d*, the fifth neighbor cell 320-*e*, the sixth neighbor cell 320-*f*, the seventh neighbor cell 320-*g*, or the eighth neighbor cell 320-*h*) and 7 SSBs with different SSB indices or PCIDs.

In some aspects, starting from the end of the BWP switch (e.g., after reception of the second control signaling 330), the UE 115-*b* may perform measurements on the number of cells and SSBs on a frequency layer based on whether the frequency layer is intra-frequency or inter-frequency according to the reference SSB defined by the new BWP and/or serving cell measurement object. In some aspects, if during the BWP switch, a change in the reference SSB reclassifies the previously configured intra-frequency measurement objects as inter-frequency measurement objects, the UE 115-*b* may choose to stop performing measurements on some of the neighbor cells and/or SSBs (e.g., going from 8 neighbor cells to 4 neighbor cells and 14 SSBs to 7 SSBs) based on past measurement quantities. For example, the UE 115-*b* may choose to stop performing measurements on some of neighbor cells or SSBs based on past RSRP, RSRQ, or SINR measurements of the neighbor cells and SSBs. In some aspects, the network entity 105-*a* may indicate which neighbor cells and SSBs to stop performing measurements on, for example in the second control signaling 330.

In some aspects, if an SSB outside the active BWP for the UE 115-*b* is configured as the reference SSB for intra-frequency measurements (e.g., and thus an MG is used), then the number of SSBs to be measured on the intra-frequency layer may not be lower bounded by the number of configured RLM-RS SSB resources, because the RLM-RS resources, in this case, would be based on an NCD-SSB, which lies within the active BWP, and are not considered as intra-frequency measurements.

In some aspects, during a BWP switch related transition period, the UE 115-*b* may perform measurements on the number of neighbor cells and SSBs according to the more relaxed configuration between the measurement type before the BWP switch and after the BWP switch. For example, if the UE 115-*b* was configured to measure 4 neighbor cells and 7 SSBs (e.g., inter-frequency) before the switch, and the UE 115-*b* is configured to measure 8 neighbor cells and 14 SSBs after the switch (e.g., intra-frequency), during the transition period the UE 115-*b* may perform measurements according to the more relaxed configuration (e.g., the UE 115-*b* may perform the measurements on the 4 neighbor cells and 7 SSBs during the transition period). The transition period may correspond to an evaluation period where the BWP switch occurred. In some aspects, the evaluation period may be defined according to the configuration before the BWP switch. In some aspects, the evaluation period may be defined according to the more relaxed configuration (e.g., between the configurations before and after the BWP switch). In some aspects, the transition period may last a predetermined amount of time. In some aspects, the second control signaling 330 may indicate a length of the transition period.

A defined quantity of SSBs may be used for primary synchronization signal or secondary synchronization signal detection, SSB index identification, and/or SSB measurements. The defined quantities of SSBs may be different for intra-frequency neighbor cell measurements with MGs and without MGs and for inter-frequency neighbor cell measurements with MGs and without MGs.

As described herein, after a BWP switch is completed, a neighbor cell and/or SSB may be reclassified from one measurement type to another (e.g., from one of intra-frequency with MG, intra-frequency without MG, inter-frequency with MG, or inter-frequency without MG to another).

In some aspects, after the BWP switch is completed, a neighbor cell and/or SSB configured to be measured (e.g., a measurement object) may be detected and/or measured with the delays corresponding to the inter-frequency or intra-frequency measurements with or without MG based on the new BWP and the serving cell measurement object. For example, the UE 115-*b* may drop an ongoing cell detection, SSB identification, or measurement procedure and start again with the delay parameters corresponding to the new BWP and serving cell measurement object. An example delay parameter may be a reporting delay parameter corresponding to the time between completing a measurement and transmitting a report of the measurement. For example, if the measurement object type changes from intra-frequency without gaps to inter-frequency with gaps, the UE 115-*b* may perform the measurement object with delays corresponding to inter-frequency with MGs. For example, if the UE 115-*b* needs 5 SSB samples to perform a measurement, and the UE 115-*b* takes 3 SSB samples before the BWP switch, the UE 115-*b* may perform the 5 SSB samples after the BWP in accordance with the measurement object type after the BWP switch.

In some aspects, if the UE 115-*b* is in the process of a cell detection, an SSB identification, or a measurement procedure, and a BWP switch is triggered, the UE 115-*b* may continue with the cell detection, SSB identification, or measurement procedure, and the corresponding delay may be determined as the greater of the delay parameters before and after the BWP switch. In some aspects, when the cell detection, SSB identification, or measurement procedure delay parameters are more stringent in the target BWP (e.g., the BWP after the BWP switch), relaxation of the delay parameters may be provided. For example, the UE 115-*b* may continue the measurements with delays corresponding to the old delay parameters (e.g., the less stringent delay parameters) for a period of time (e.g., a transition period) and then may switch to the new delay parameters.

In some aspects, if the UE 115-*b* is in the process of a cell detection, an SSB identification, or a measurement procedure, and a BWP switch is triggered, the UE 115-*b* may continue with the cell detection, SSB identification, or measurement procedure, and the corresponding total delay may be determined by the period that the UE 115-*b* uses to obtain the required number of samples for the given measurement. For example, the corresponding total delay may partly be determined by the period that the UE 115-*b* uses to obtain the required number of samples for the given measurement when the BWP switch does not change the classification of the neighbor cell and/or SSB measurements between intra-frequency and inter-frequency. The corresponding total delay may partly be determined by the period that the UE 115-*b* uses to obtain the required number of samples for the given measurement when the BWP switch changes the classification of the neighbor cell and/or SSB measurements between intra-frequency with MG, intra-frequency without MG, inter-frequency with MG, and inter-frequency without MG. For example, if the UE 115-*b* needs 5 SSB samples to perform a measurement, and the UE 115-*b* takes 3 SSB samples before the BWP switch, the UE 115-*b* needs 2 SSB samples after the switch. The total time will accordingly equal the 3 SSB sample period corresponding to the availability of the SSB in the previous BWP plus the 2 SSB sample period corresponding to the availability of that SSB in the new BWP. Accordingly, the UE 115-*b* may combine samples of the same SSB before and after a BWP switch.

Figure 4:
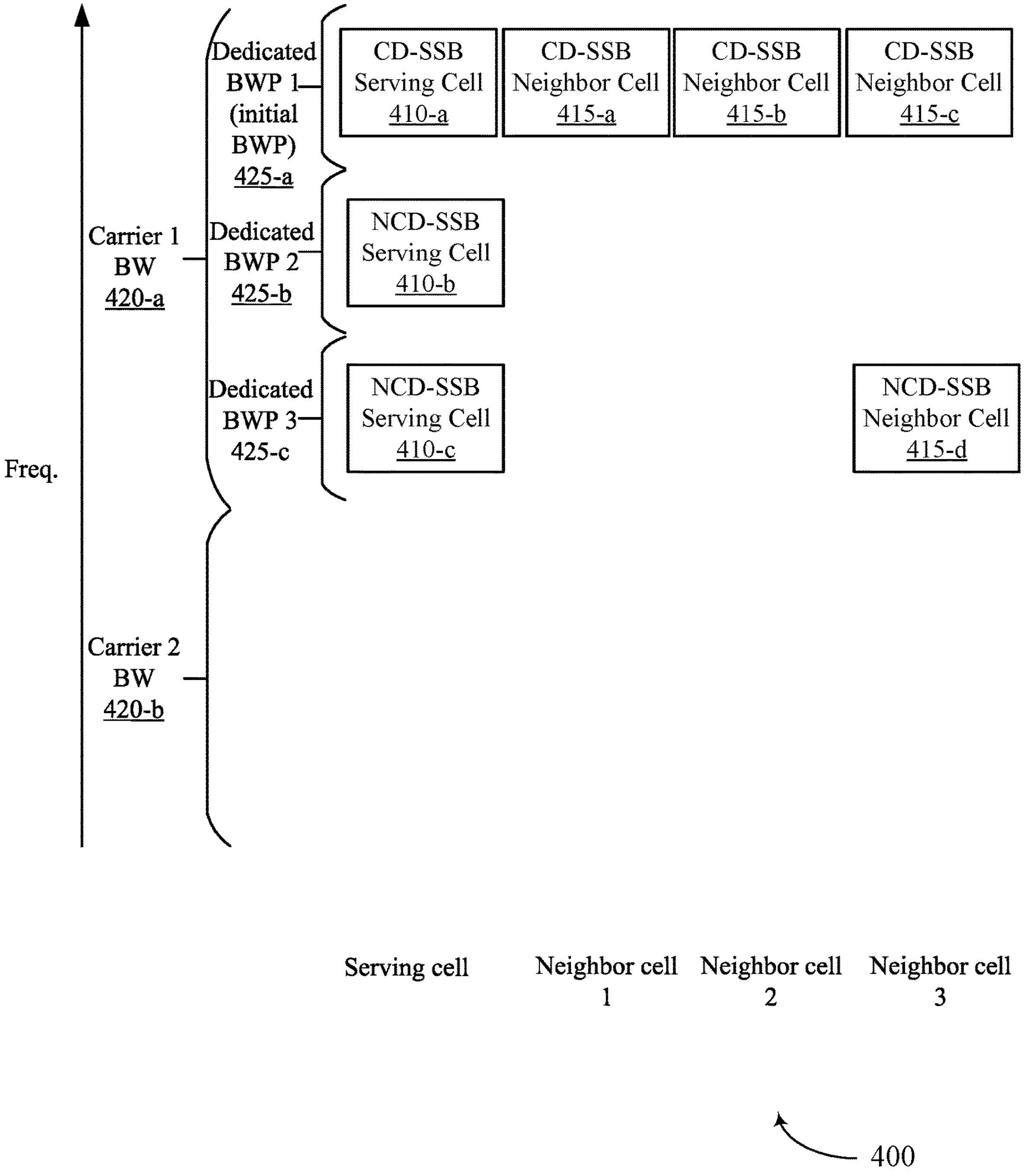
FIG. 4 illustrates an example of a resource diagram that supports measurement type transition configurations in accordance with one or more aspects of the present disclosure.

FIG. 4 illustrates an example of a resource diagram 400 that supports measurement type transition configurations in accordance with one or more aspects of the present disclosure. In some examples, the resource diagram 400 may implement aspects of wireless communications systems 100 or 300.

As described herein, a UE 115 may be configured with an active BWP for a carrier bandwidth. For example, resource diagram 400 illustrates a first carrier bandwidth 420-*a* (e.g., the current carrier bandwidth for the UE 115) and a second carrier bandwidth 420-*b*. The first carrier bandwidth may include a first BWP 425-*a*, a second BWP 425-*b*, and a third BWP 425-*c*. The first BWP 425-*a* may initially be configured as the active BWP for the UE. A CD-SSB 410-*a* for the first BWP may be configured as the SSB for the serving cell in the first BWP 425-*a*. A first CD-SSB 415-*a* for a first neighbor cell, a second CD-SSB 415-*b* for a second neighbor cell, and a third CD-SSB 415-*c* for a third neighbor cell may share a center frequency with the CD-SSB 410-*a*. An NCD-SSB 410-*b* for the second BWP 425-*b* may be configured for the serving cell. The NCD-SSB 410-*b* may be configured within the second BWP 425-*b* but not may not be configured as the serving cell measurement object. An NCD-SSB 410-*c* for the third BWP 425-*c* may be configured for the serving cell. An NCD-SSB 415-*d* for the third BWP 425-*c* may be configured for the third neighbor cell. The NCD-SSB 410-*c* may be configured as the serving cell measurement object for the third BWP 425-*c*.

Figure 5:
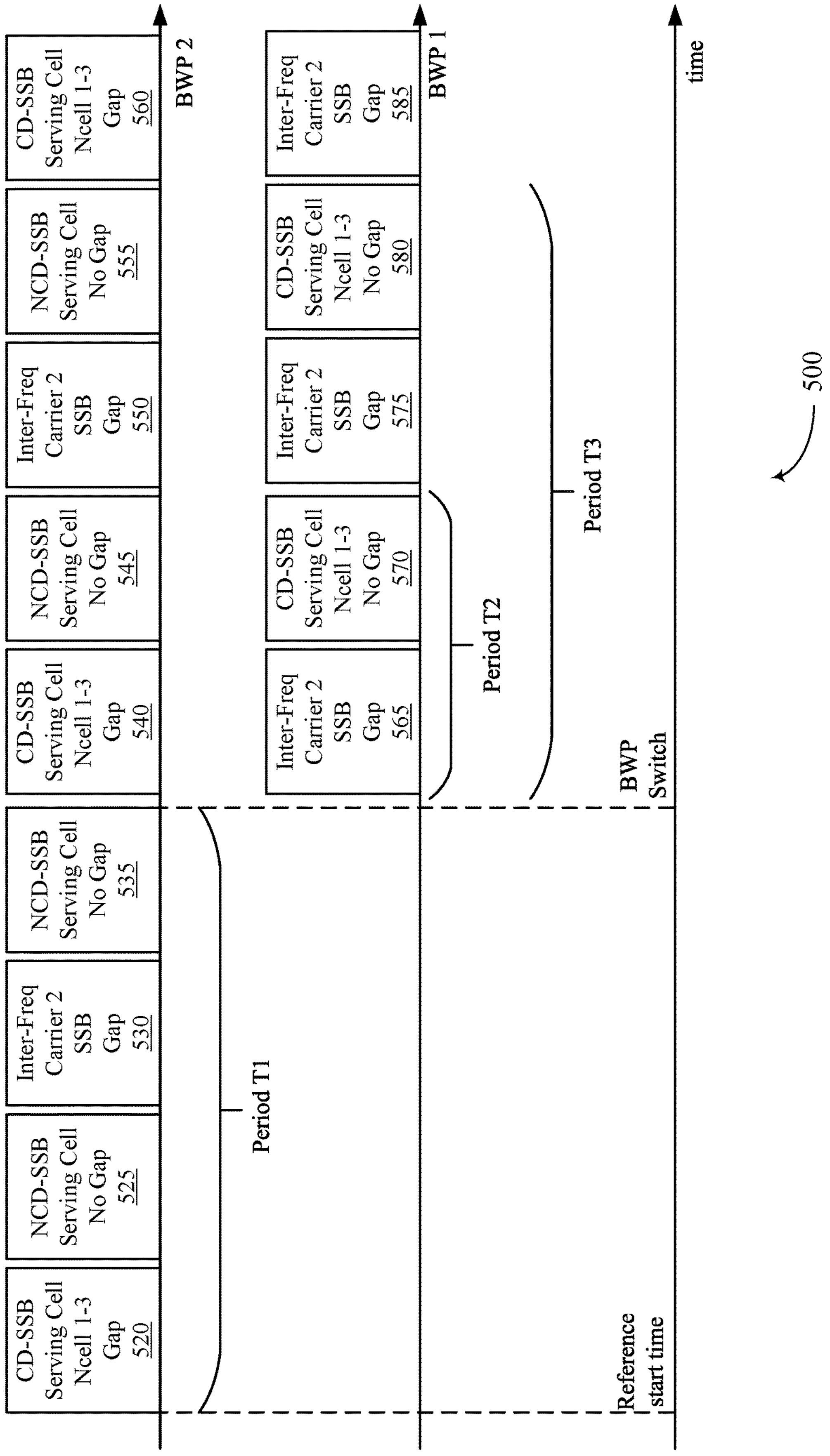
FIG. 5 illustrates an example of a timing diagram that supports measurement type transition configurations in accordance with one or more aspects of the present disclosure.

FIG. 5 illustrates an example of a timing diagram 500 that supports measurement type transition configurations in accordance with one or more aspects of the present disclosure. In some examples, the timing diagram 500 may implement aspects of wireless communications systems 100 or 300.

A reference start time may begin when the network transmits a CD-SSB 520 for a serving cell and neighbor cells (e.g., neighbor cells 1-3) with an MG on a second BWP. The network may subsequently transmit an NCD-SSB 525 for the serving cell without an MG on the second BWP. The network may subsequently transmit an inter-frequency SSB 530 for a second carrier on the second BWP. The network may subsequently transmit an NCD-SSB 535 for the serving cell without an MG on the second BWP.

After the NCD-SSB 535, the network may trigger a switch of the active BWP for the UE 115 from the second BWP to the first BWP. The network may subsequently transmit a CD-SSB 540 for the serving cell and neighbor cells (e.g., neighbor cells 1-3) with an MG on the second BWP and an inter-frequency SSB 565 for a second carrier on the first BWP. The network may subsequently transmit an NCD-SSB 545 for the serving cell without an MG on the second BWP and a CD-SSB 570 for the serving cell and neighbor cells (e.g., neighbor cells 1-3) without an MG on the first BWP. The network may subsequently transmit an inter-frequency SSB 550 for a second carrier on the second BWP and an inter-frequency SSB 575 for a second carrier on the first BWP. The network may subsequently transmit an NCD-SSB 555 for the serving cell without an MG on the second BWP and a CD-SSB 580 for the serving cell and neighbor cells (e.g., neighbor cells 1-3) without an MG on the first BWP. The network may subsequently transmit a CD-SSB 560 for the serving cell and neighbor cells (e.g., neighbor cells 1-3) with an MG on the second BWP and an inter-frequency SSB 585 for a second carrier on the first BWP.

The UE may require 2 samples to complete a search and/or measurement procedure (e.g., a cell detection, an SSB identification, or a measurement procedure). For example, for one of the neighbor cells 1,2, or 3, the UE receives an SSB in the CD-SSB 520 before the BWP switch, the CD-SSB 570 after the BWP switch, and the CD-SSB 580 after the BWP switch. If the UE is able to reuse the measurement of the neighbor cell from the CD-SSB 520, the time for the configured cell detection, SSB identification, or measurement procedure corresponds to T1+T2. If the UE is not able to reuse the measurement of the neighbor cell from the CD-SSB 520, the time for the configured cell detection, SSB identification, or measurement procedure corresponds to T1+T3.

Figure 6:
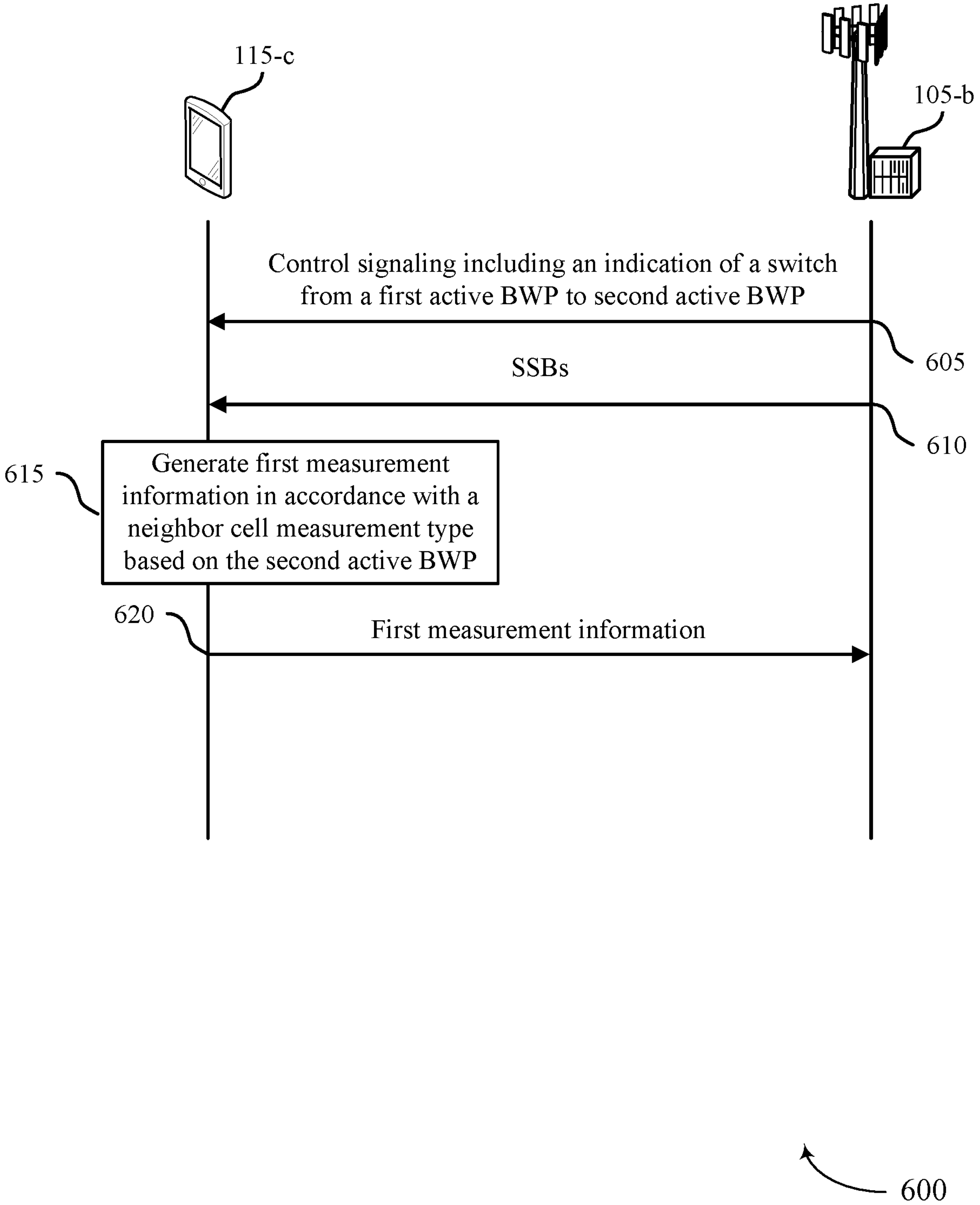
FIG. 6 illustrates an example of a process flow that supports measurement type transition configurations in accordance with one or more aspects of the present disclosure.

FIG. 6 illustrates an example of a process flow 600 that supports measurement type transition configurations in accordance with one or more aspects of the present disclosure. The process flow 600 may include a UE 115-*c*, which may be an example of a UE 115 as described herein. The process flow 600 may include a network entity 105-*b*, which may be an example of a network entity 105 as described herein. In the following description of the process flow 600, the operations between the network entity 105-*b* and the UE 115-*c* may be transmitted in a different order than the example order shown, or the operations performed by the network entity 105-*b* and the UE 115-*c* may be performed in different orders or at different times. Some operations may also be omitted from the process flow 600, and other operations may be added to the process flow 600.

At 605, the UE 115-*c* may receive, from the network entity 105-*b*, control signaling including an indication for the UE 115-*c* to switch from a first active BWP associated with a first neighbor cell measurement type to a second active BWP, where the first neighbor cell measurement type is associated with a first reference SSB.

At 610, the network entity 105-*b* may transmit a first quantity of SSBs associated with a first quantity of neighbor cells via the first quantity of neighbor cells.

At 615, the UE 115-*c* may generate first measurement information corresponding to the first quantity of SSBs associated with the first quantity of neighbor cells in accordance with a second neighbor cell measurement type, where the second neighbor cell measurement type is based on the second active BWP, and where the second neighbor cell measurement type is associated with a second reference SSB. In some aspects, the UE 115-*c* may generate the first measurement information via measuring some values directly (e.g., as for RSRP). In some aspects, the UE 115-*c* may generate the first measurement information via deriving the measurement information from measured values (e.g., as for SINR).

At 620, the UE 115-*c* may transmit, to the network entity 105-*b*, the first measurement information.

In some aspects, the first quantity of SSBs and the first quantity of neighbor cells are based on a center frequency of the second reference SSB and a frequency layer associated with the first quantity of SSBs.

In some aspects, where a second quantity of neighbor cells associated with the first neighbor cell measurement type is greater than the first quantity of neighbor cells, the UE 115-*c* may determine the first quantity of neighbor cells from the second quantity of neighbor cells based on second measurement information corresponding to of the second quantity of neighbor cells.

In some aspects, a second quantity of neighbor cells associated with the first neighbor cell measurement type is greater than the first quantity of neighbor cells, and the control signaling includes an indication of cells included in the first quantity of neighbor cells.

In some aspects, where a center frequency of the second reference SSB is outside of the second active BWP, and where the SSBs of the first quantity of SSBs have the center frequency, the UE 115-*c* may determine the first quantity of SSBs independently of a quantity of configured radio link management reference signal SSBs.

In some aspects, where the first neighbor cell measurement type is associated with a second quantity of SSBs and a second quantity of neighbor cells, and where the second neighbor cell measurement type is associated with the first quantity of SSBs and the first quantity of neighbor cells, the UE 115-*c* may generate, during a period between reception of the control signaling at 605 and generation of first measurement information at 615, second measurement information corresponding to a lesser of the first quantity of SSBs or the second quantity of SSBs. The UE 115-*c* may report the second measurement information to the network entity 105-*b*. In some aspects, the control signaling includes an indication of the period.

In some aspects, the UE 115-*c* may receive, from the network entity 105-*b*, second control signaling including an indication for the first network node to perform a set of measurements for a first cell in accordance with the first neighbor cell measurement type. The UE 115-*c* may generate, prior to the reception of the control signaling, second measurement information corresponding to a subset of measurements of the set of measurements in accordance with the first neighbor cell measurement type. The UE 115-*c* may generate, after reception of the control signaling, third measurement information corresponding to the set of measurements in accordance with the second neighbor cell measurement type. The UE 115-*c* may report the third measurement information to the network entity 105-*b*. In some aspects, where the first neighbor cell measurement type is associated with a first delay parameter greater than a second delay parameter associated with the second neighbor cell measurement type, generating the first measurement information may include generating the first measurement information in accordance with the first delay parameter.

In some aspects, the UE 115-*c* may receive, from the network entity 105-*b*, second control signaling including an indication for the first network node to perform a set of measurements for a first cell in accordance with the first neighbor cell measurement type. The UE 115-*c* may generate, prior to the reception of the control signaling, second measurement information corresponding to a subset of measurements of the set of measurements in accordance with the first neighbor cell measurement type. The UE 115-*c* may generate, after reception of the control signaling, third measurement information corresponding to a remainder of the set of measurements in accordance with the second neighbor cell measurement type. The UE 115-*c* may report the second measurement information and the third measurement information to the network entity 105-*b*.

Figure 7:
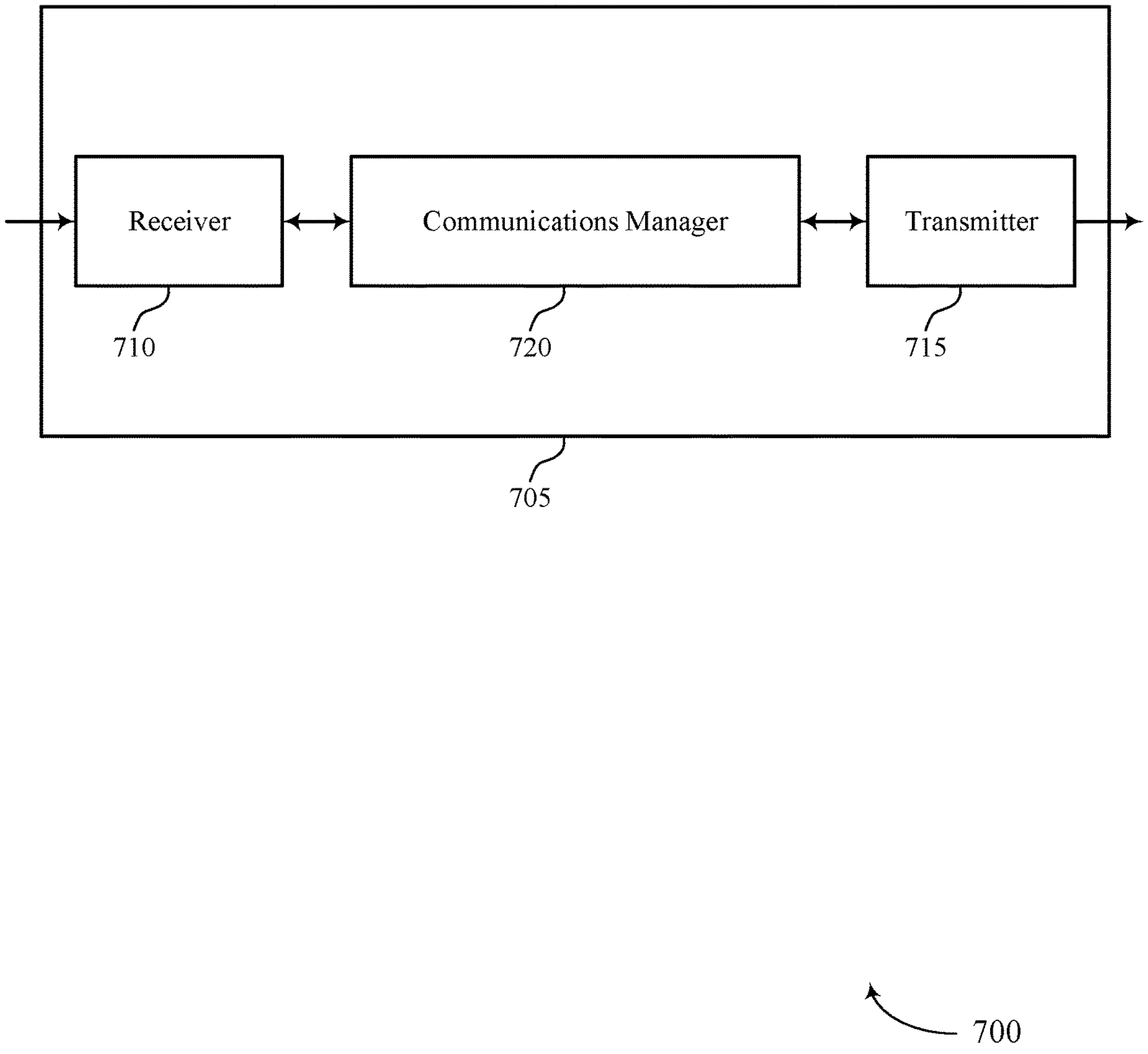
FIGS. 7 and 8 show block diagrams of devices that support measurement type transition configurations in accordance with one or more aspects of the present disclosure.

FIG. 7 shows a block diagram 700 of a device 705 that supports measurement type transition configurations in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to measurement type transition configurations). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to measurement type transition configurations). In some aspects, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of measurement type transition configurations as described herein. For example, the communications manager 720, the receiver 710, the transmitter 715, or various combinations or components thereof may support a method for performing one or more of the functions described herein.

In some aspects, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a first network node in accordance with examples as disclosed herein. For example, the communications manager 720 may be configured as or otherwise support a means for receiving, from a second network node, control signaling including an indication for the first network node to switch from a first active BWP associated with a first neighbor cell measurement type to a second active BWP, where the first neighbor cell measurement type is associated with a first reference SSB. The communications manager 720 may be configured as or otherwise support a means for generating first measurement information corresponding to a first quantity of SSBs associated with a first quantity of neighbor cells in accordance with a second neighbor cell measurement type, where the second neighbor cell measurement type is based on the second active BWP, where the second neighbor cell measurement type is associated with a second reference SSB. The communications manager 720 may be configured as or otherwise support a means for transmitting, to the second network node, the first measurement information.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced processing and more efficient utilization of communication resources.

Figure 8:
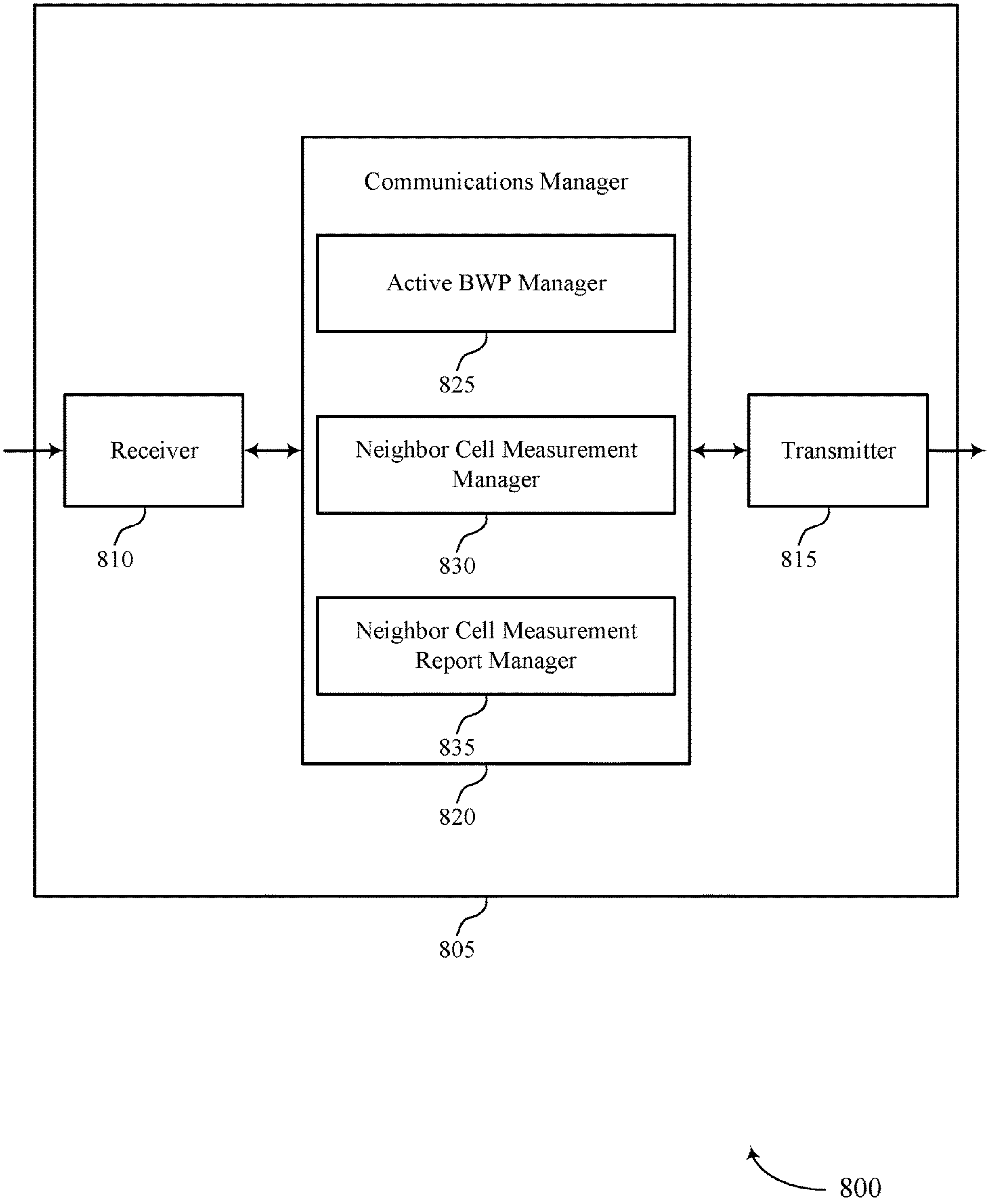

FIG. 8 shows a block diagram 800 of a device 805 that supports measurement type transition configurations in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to measurement type transition configurations). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to measurement type transition configurations). In some aspects, the transmitter 815 may be co-located with a receiver 810 in a transceiver module. The transmitter 815 may utilize a single antenna or a set of multiple antennas.

The device 805, or various components thereof, may be an example of means for performing various aspects of measurement type transition configurations as described herein. For example, the communications manager 820 may include an active BWP manager 825, a neighbor cell measurement manager 830, a neighbor cell measurement report manager 835, or any combination thereof. The communications manager 820 may be an example of aspects of a communications manager 720 as described herein. In some aspects, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a first network node in accordance with examples as disclosed herein. The active BWP manager 825 may be configured as or otherwise support a means for receiving, from a second network node, control signaling including an indication for the first network node to switch from a first active BWP associated with a first neighbor cell measurement type to a second active BWP, where the first neighbor cell measurement type is associated with a first reference SSB. The neighbor cell measurement manager 830 may be configured as or otherwise support a means for generating first measurement information corresponding to a first quantity of SSBs associated with a first quantity of neighbor cells in accordance with a second neighbor cell measurement type, where the second neighbor cell measurement type is based on the second active BWP, where the second neighbor cell measurement type is associated with a second reference SSB. The neighbor cell measurement report manager 835 may be configured as or otherwise support a means for transmitting, to the second network node, the first measurement information.

Figure 9:
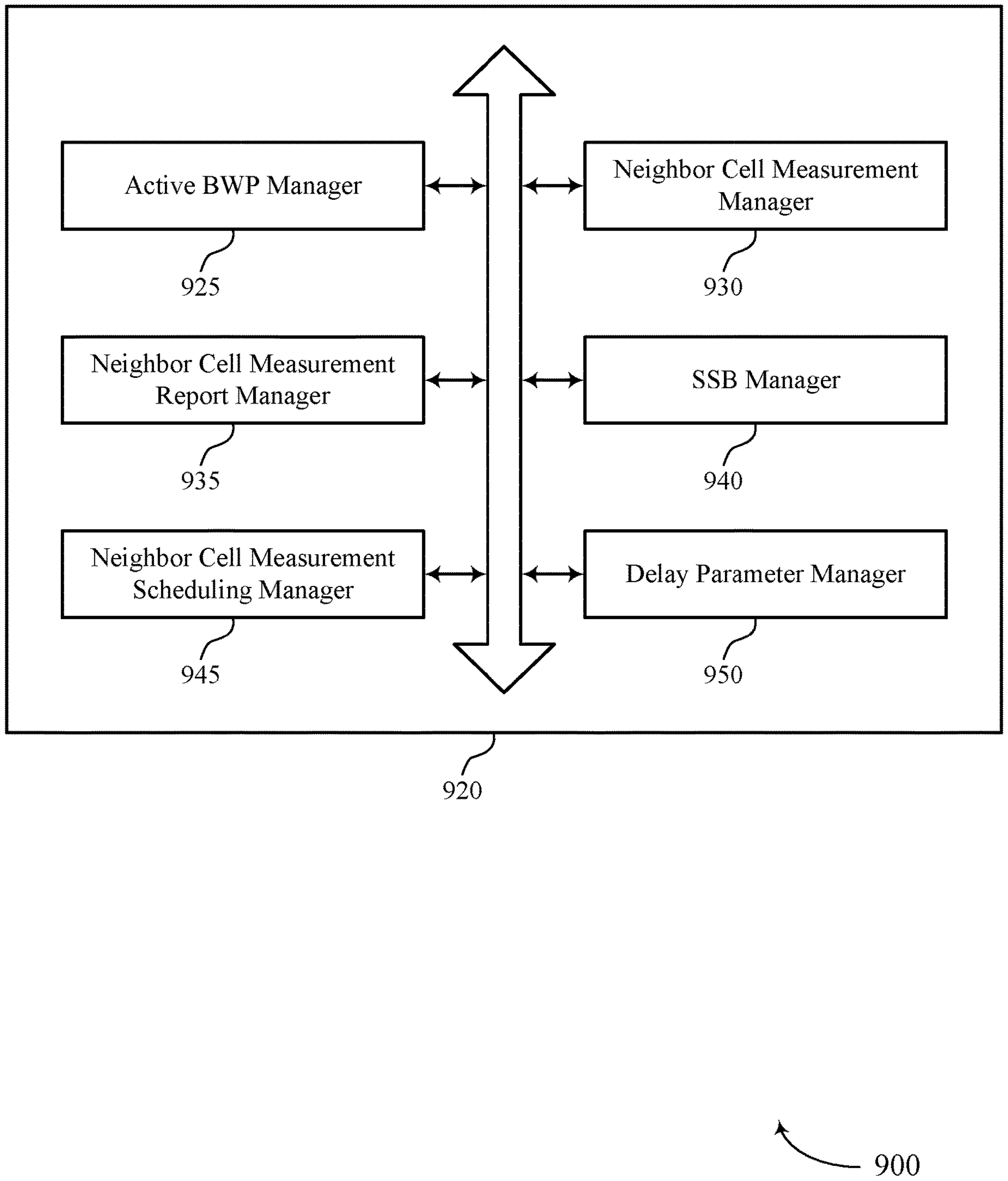
FIG. 9 shows a block diagram of a communications manager that supports measurement type transition configurations in accordance with one or more aspects of the present disclosure.

FIG. 9 shows a block diagram 900 of a communications manager 920 that supports measurement type transition configurations in accordance with one or more aspects of the present disclosure. The communications manager 920 may be an example of aspects of a communications manager 720, a communications manager 820, or both, as described herein. The communications manager 920, or various components thereof, may be an example of means for performing various aspects of measurement type transition configurations as described herein. For example, the communications manager 920 may include an active BWP manager 925, a neighbor cell measurement manager 930, a neighbor cell measurement report manager 935, an SSB manager 940, a neighbor cell measurement scheduling manager 945, a delay parameter manager 950, or any combination thereof. Each of these components may communicate, directly or indirectly, with one another (e.g., via one or more buses).

The communications manager 920 may support wireless communications at a first network node in accordance with examples as disclosed herein. The active BWP manager 925 may be configured as or otherwise support a means for receiving, from a second network node, control signaling including an indication for the first network node to switch from a first active BWP associated with a first neighbor cell measurement type to a second active BWP, where the first neighbor cell measurement type is associated with a first reference SSB. The neighbor cell measurement manager 930 may be configured as or otherwise support a means for generating first measurement information corresponding to a first quantity of SSBs associated with a first quantity of neighbor cells in accordance with a second neighbor cell measurement type, where the second neighbor cell measurement type is based on the second active BWP, where the second neighbor cell measurement type is associated with a second reference SSB. The neighbor cell measurement report manager 935 may be configured as or otherwise support a means for transmitting, to the second network node, the first measurement information.

In some aspects, the first quantity of SSBs and the first quantity of neighbor cells are based on a center frequency of the second reference SSB and a frequency layer associated with the first quantity of SSBs.

In some aspects, the SSB manager 940 may be configured as or otherwise support a means for determining the first quantity of neighbor cells from a second quantity of neighbor cells, where a second quantity of neighbor cells associated with the first neighbor cell measurement type is greater than the first quantity of neighbor cells, the determining based on second measurement information corresponding to of the second quantity of neighbor cells.

In some aspects, a second quantity of neighbor cells associated with the first neighbor cell measurement type is greater than the first quantity of neighbor cells. In some aspects, the control signaling includes an indication of cells included in the first quantity of neighbor cells.

In some aspects, the SSB manager 940 may be configured as or otherwise support a means for determining the first quantity of SSBs independently of a quantity of configured radio link management reference signal SSBs, where a center frequency of the second reference SSB is outside of the second active BWP, where the SSBs of the first quantity of SSBs have the center frequency.

In some aspects, the neighbor cell measurement manager 930 may be configured as or otherwise support a means for generating during a period between reception of the control signaling and generation of first measurement information, second measurement information corresponding to a lesser of the first quantity of SSBs or a second quantity of SSBs, where the first neighbor cell measurement type is associated with the second quantity of SSBs and a second quantity of neighbor cells, where the second neighbor cell measurement type is associated with the first quantity of SSBs and the first quantity of neighbor cells.

In some aspects, the control signaling includes an indication of the period.

In some aspects, the neighbor cell measurement scheduling manager 945 may be configured as or otherwise support a means for receiving, from the second network node, second control signaling including an indication for the first network node to perform a set of measurements for a first cell in accordance with the first neighbor cell measurement type. In some aspects, the neighbor cell measurement manager 930 may be configured as or otherwise support a means for generating, prior to reception of the control signaling, second measurement information corresponding to a subset of measurements of the set of measurements in accordance with the first neighbor cell measurement type. In some aspects, the neighbor cell measurement manager 930 may be configured as or otherwise support a means for generating, after the reception of the control signaling, third measurement information corresponding to the set of measurements in accordance with the second neighbor cell measurement type.

In some aspects, to support generating the first measurement information, the delay parameter manager 950 may be configured as or otherwise support a means for generating the first measurement information in accordance with a first delay parameter, where the first neighbor cell measurement type is associated with the first delay parameter greater than a second delay parameter associated with the second neighbor cell measurement type.

In some aspects, the neighbor cell measurement scheduling manager 945 may be configured as or otherwise support a means for receiving, from the second network node, second control signaling including an indication for the first network node to perform a set of measurements for a first cell in accordance with the first neighbor cell measurement type. In some aspects, the neighbor cell measurement manager 930 may be configured as or otherwise support a means for generating, prior to reception of the control signaling, second measurement information corresponding to a subset of measurements of the set of measurements in accordance with the first neighbor cell measurement type. In some aspects, the neighbor cell measurement manager 930 may be configured as or otherwise support a means for generating, after reception of the control signaling, third measurement information corresponding to a remainder of the set of measurements in accordance with the second neighbor cell measurement type.

Figure 10:
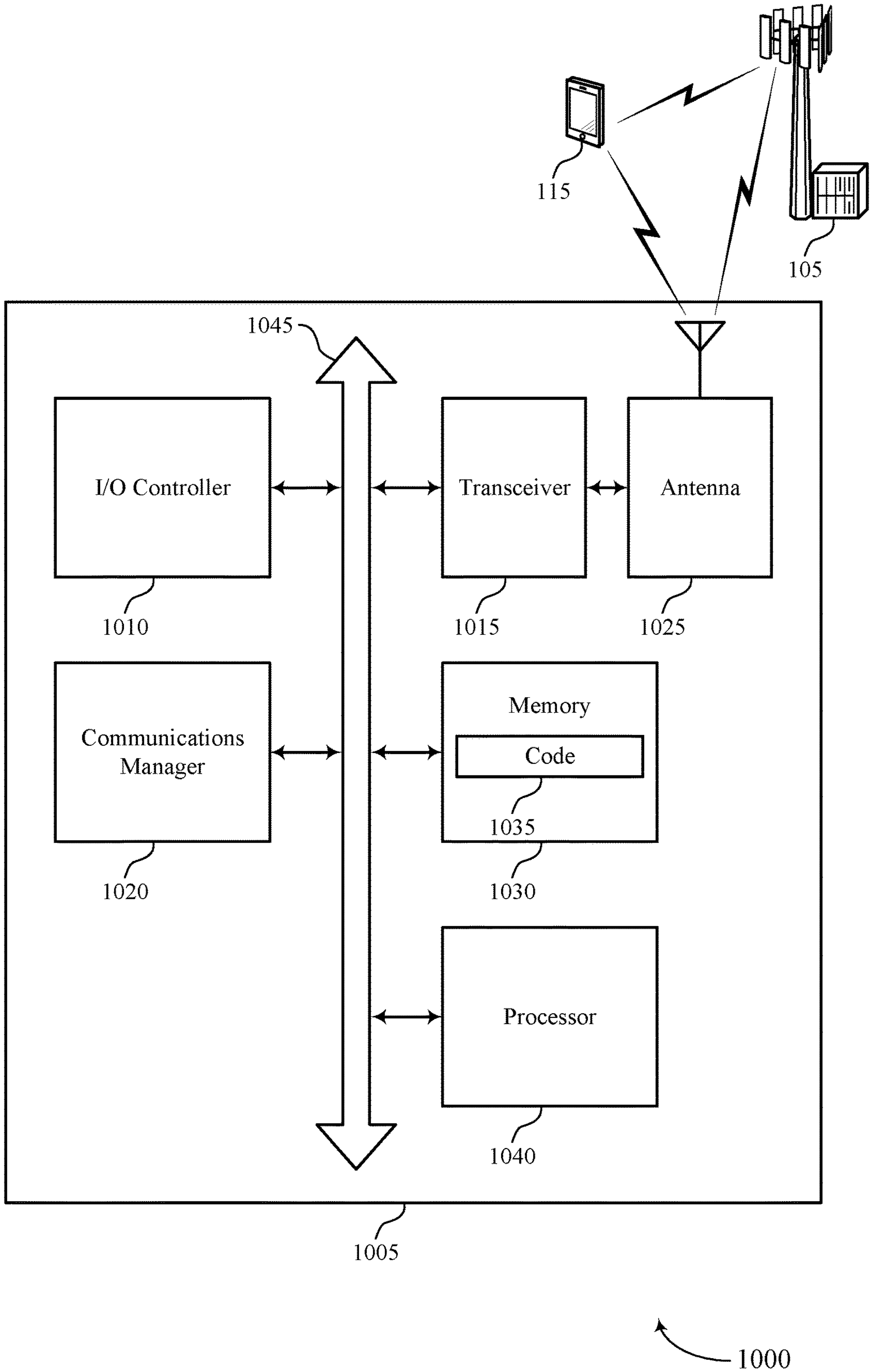
FIG. 10 shows a diagram of a system including a device that supports measurement type transition configurations in accordance with one or more aspects of the present disclosure.

FIG. 10 shows a diagram of a system 1000 including a device 1005 that supports measurement type transition configurations in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting measurement type transition configurations). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a first network node in accordance with examples as disclosed herein. For example, the communications manager 1020 may be configured as or otherwise support a means for receiving, from a second network node, control signaling including an indication for the first network node to switch from a first active BWP associated with a first neighbor cell measurement type to a second active BWP, where the first neighbor cell measurement type is associated with a first reference SSB. The communications manager 1020 may be configured as or otherwise support a means for generating first measurement information corresponding to a first quantity of SSBs associated with a first quantity of neighbor cells in accordance with a second neighbor cell measurement type, where the second neighbor cell measurement type is based on the second active BWP, where the second neighbor cell measurement type is associated with a second reference SSB. The communications manager 1020 may be configured as or otherwise support a means for transmitting, to the second network node, the first measurement information.

By including or configuring the communications manager 1020 in accordance with examples as described herein, the device 1005 may support techniques for improved user experience related to reduced processing, more efficient utilization of communication resources, improved coordination between devices, and improved utilization of processing capability.

In some aspects, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some aspects, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of measurement type transition configurations as described herein, or the processor 1040 and the memory 1030 may be otherwise configured to perform or support such operations.

Figure 11:
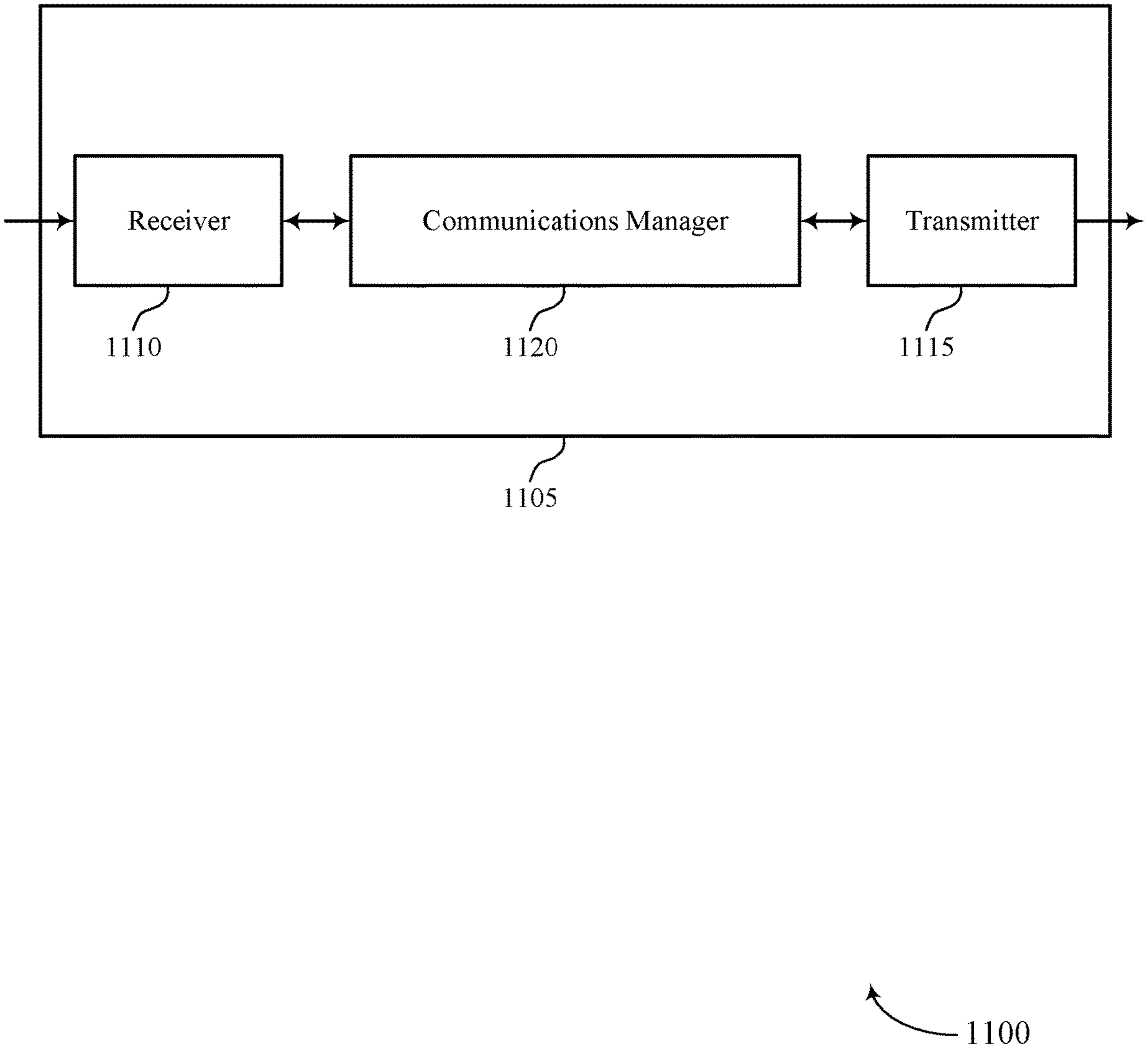
FIGS. 11 and 12 show block diagrams of devices that support measurement type transition configurations in accordance with one or more aspects of the present disclosure.

FIG. 11 shows a block diagram 1100 of a device 1105 that supports measurement type transition configurations in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some aspects, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some aspects, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some aspects, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of measurement type transition configurations as described herein. For example, the communications manager 1120, the receiver 1110, the transmitter 1115, or various combinations or components thereof may support a method for performing one or more of the functions described herein.

In some aspects, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. For example, the communications manager 1120 may be configured as or otherwise support a means for transmitting, to a second network node, control signaling including an indication for the second network node to switch from a first active BWP associated with a first neighbor cell measurement type to a second active BWP, where the first neighbor cell measurement type is associated with a first reference SSB. The communications manager 1120 may be configured as or otherwise support a means for transmitting a first quantity of SSBs associated with a first quantity of neighbor cells via the first quantity of neighbor cells. The communications manager 1120 may be configured as or otherwise support a means for receiving, from the second network node, a first measurement information corresponding to the first quantity of SSBs in accordance with a second neighbor cell measurement type associated with the second active BWP, where the second neighbor cell measurement type is associated with a second reference SSB.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for reduced processing and more efficient utilization of communication resources.

Figure 12:
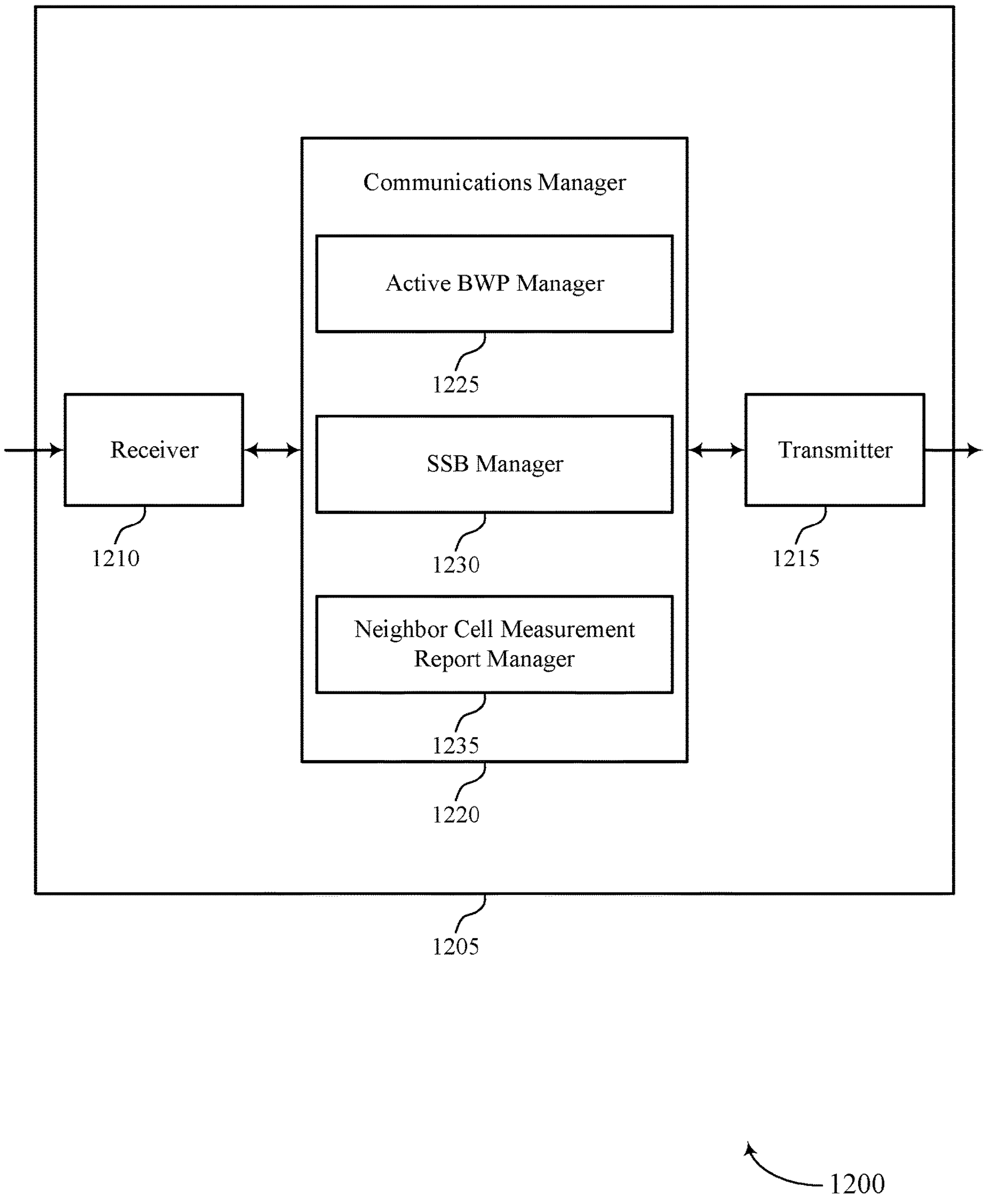

FIG. 12 shows a block diagram 1200 of a device 1205 that supports measurement type transition configurations in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some aspects, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some aspects, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some aspects, the transmitter 1215 and the receiver 1210 may be co-located in a transceiver, which may include or be coupled with a modem.

The device 1205, or various components thereof, may be an example of means for performing various aspects of measurement type transition configurations as described herein. For example, the communications manager 1220 may include an active BWP manager 1225, an SSB manager 1230, a neighbor cell measurement report manager 1235, or any combination thereof. The communications manager 1220 may be an example of aspects of a communications manager 1120 as described herein. In some aspects, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications in accordance with examples as disclosed herein. The active BWP manager 1225 may be configured as or otherwise support a means for transmitting, to a second network node, control signaling including an indication for the second network node to switch from a first active BWP associated with a first neighbor cell measurement type to a second active BWP, where the first neighbor cell measurement type is associated with a first reference SSB. The SSB manager 1230 may be configured as or otherwise support a means for transmitting a first quantity of SSBs associated with a first quantity of neighbor cells via the first quantity of neighbor cells. The neighbor cell measurement report manager 1235 may be configured as or otherwise support a means for receiving, from the second network node, a first measurement information corresponding to the first quantity of SSBs in accordance with a second neighbor cell measurement type associated with the second active BWP, where the second neighbor cell measurement type is associated with a second reference SSB.

Figure 13:
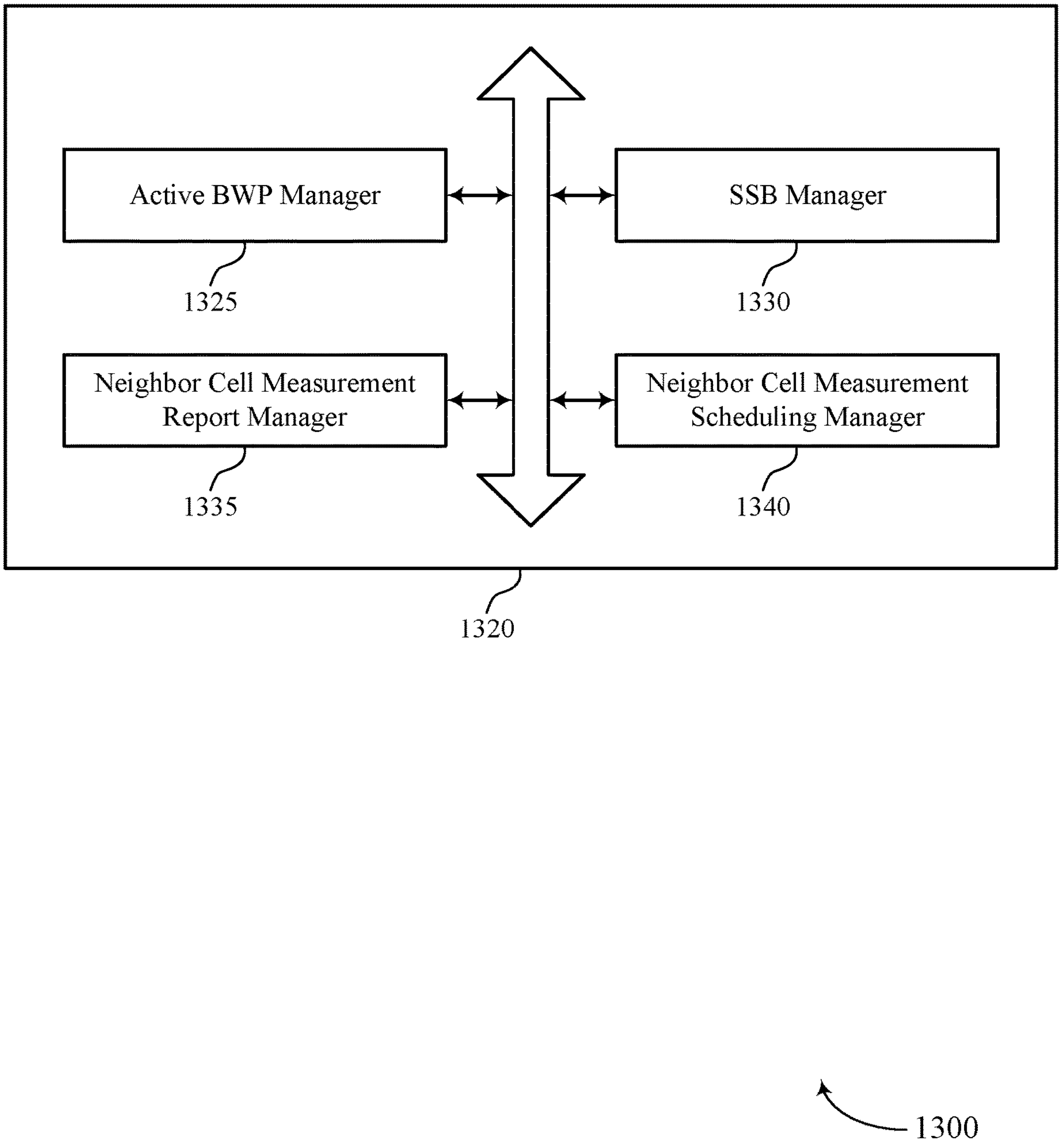
FIG. 13 shows a block diagram of a communications manager that supports measurement type transition configurations in accordance with one or more aspects of the present disclosure.

FIG. 13 shows a block diagram 1300 of a communications manager 1320 that supports measurement type transition configurations in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of measurement type transition configurations as described herein. For example, the communications manager 1320 may include an active BWP manager 1325, an SSB manager 1330, a neighbor cell measurement report manager 1335, a neighbor cell measurement scheduling manager 1340, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications in accordance with examples as disclosed herein. The active BWP manager 1325 may be configured as or otherwise support a means for transmitting, to a second network node, control signaling including an indication for the second network node to switch from a first active BWP associated with a first neighbor cell measurement type to a second active BWP, where the first neighbor cell measurement type is associated with a first reference SSB. The SSB manager 1330 may be configured as or otherwise support a means for transmitting a first quantity of SSBs associated with a first quantity of neighbor cells via the first quantity of neighbor cells. The neighbor cell measurement report manager 1335 may be configured as or otherwise support a means for receiving, from the second network node, a first measurement information corresponding to the first quantity of SSBs in accordance with a second neighbor cell measurement type associated with the second active BWP, where the second neighbor cell measurement type is associated with a second reference SSB.

In some aspects, the first quantity of SSBs and the first quantity of neighbor cells are based on a center frequency of the second reference SSB and a frequency layer associated with the first quantity of SSBs.

In some aspects, a second quantity of neighbor cells associated with the first neighbor cell measurement type is greater than the first quantity of neighbor cells. In some aspects, the control signaling includes an indication of cells included in the first quantity of neighbor cells.

In some aspects, a center frequency of the second reference SSB is outside of the second active BWP. In some aspects, the SSBs of the first quantity of SSBs have the center frequency. In some aspects, the first quantity of SSBs is independent of a quantity of configured radio link management reference signal SSBs.

In some aspects, the neighbor cell measurement report manager 1335 may be configured as or otherwise support a means for receiving from the second network node, an indication of second measurement information at the second network node during a period between transmission of the control signaling and a generation of the first measurement information at the second network node, where the first neighbor cell measurement type is associated with a second quantity of SSBs and a second quantity of neighbor cells, where the second neighbor cell measurement type is associated with the first quantity of SSBs and the first quantity of neighbor cells, and where the second measurement information corresponds to a lesser of the first quantity of SSBs or the second quantity of SSBs.

In some aspects, the control signaling includes an indication of the period.

In some aspects, the neighbor cell measurement scheduling manager 1340 may be configured as or otherwise support a means for transmitting, to the second network node and prior to the control signaling, second control signaling including an indication for the second network node to perform a set of measurements for a first cell in accordance with the first neighbor cell measurement type. In some aspects, the neighbor cell measurement report manager 1335 may be configured as or otherwise support a means for receiving, from the second network node, second measurement information corresponding to the set of measurements, where the set of measurements are associated with the second neighbor cell measurement type.

In some aspects, the first neighbor cell measurement type is associated with a first delay parameter greater than a second delay parameter associated with the second neighbor cell measurement type. In some aspects, the set of measurements are associated with the first delay parameter.

In some aspects, the neighbor cell measurement scheduling manager 1340 may be configured as or otherwise support a means for transmitting, to the second network node and prior to the control signaling, second control signaling including an indication for the second network node to perform a set of measurements for a first cell in accordance with the first neighbor cell measurement type. In some aspects, the neighbor cell measurement report manager 1335 may be configured as or otherwise support a means for receiving, from the second network node, second measurement information corresponding to the set of measurements, where a subset of the set of measurements prior to the control signaling are associated with the first neighbor cell measurement type, and a remainder of the set of measurements are associated with the second neighbor cell measurement type.

Figure 14:
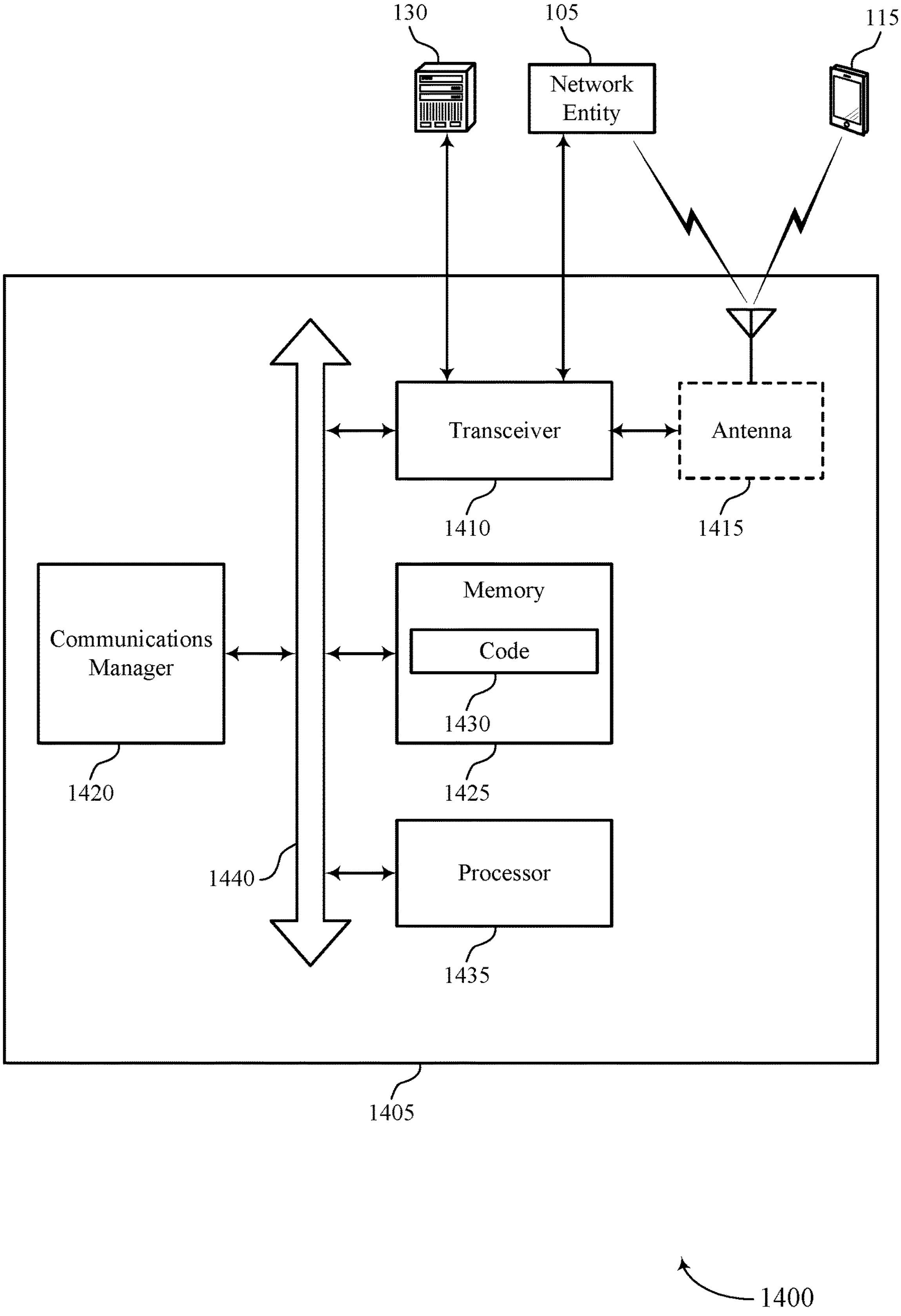
FIG. 14 shows a diagram of a system including a device that supports measurement type transition configurations in accordance with one or more aspects of the present disclosure.

FIG. 14 shows a diagram of a system 1400 including a device 1405 that supports measurement type transition configurations in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some aspects, the transceiver 1410 may include a wired transceiver and may communicate bi-directionally with another wired transceiver. Additionally, or alternatively, in some aspects, the transceiver 1410 may include a wireless transceiver and may communicate bi-directionally with another wireless transceiver. In some aspects, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. In some aspects, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting measurement type transition configurations). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some aspects, a bus 1440 may support communications of (e.g., within) a protocol layer of a protocol stack. In some aspects, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some aspects, the communications manager 1420 may manage aspects of communications with a core network 130 (e.g., via one or more wired or wireless backhaul links). For example, the communications manager 1420 may manage the transfer of data communications for client devices, such as one or more UEs 115. In some aspects, the communications manager 1420 may manage communications with other network entities 105, and may include a controller or scheduler for controlling communications with UEs 115 in cooperation with other network entities 105. In some aspects, the communications manager 1420 may support an X2 interface within an LTE/LTE-A wireless communications network technology to provide communication between network entities 105.

The communications manager 1420 may support wireless communications in accordance with examples as disclosed herein. For example, the communications manager 1420 may be configured as or otherwise support a means for transmitting, to a second network node, control signaling including an indication for the second network node to switch from a first active BWP associated with a first neighbor cell measurement type to a second active BWP, where the first neighbor cell measurement type is associated with a first reference SSB. The communications manager 1420 may be configured as or otherwise support a means for transmitting a first quantity of SSBs associated with a first quantity of neighbor cells via the first quantity of neighbor cells. The communications manager 1420 may be configured as or otherwise support a means for receiving, from the second network node, a first measurement information corresponding to the first quantity of SSBs in accordance with a second neighbor cell measurement type associated with the second active BWP, where the second neighbor cell measurement type is associated with a second reference SSB.

By including or configuring the communications manager 1420 in accordance with examples as described herein, the device 1405 may support techniques for improved user experience related to reduced processing, more efficient utilization of communication resources, improved coordination between devices, and improved utilization of processing capability.

In some aspects, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some aspects, one or more functions described with reference to the communications manager 1420 may be supported by or performed by the transceiver 1410, the processor 1435, the memory 1425, the code 1430, or any combination thereof. For example, the code 1430 may include instructions executable by the processor 1435 to cause the device 1405 to perform various aspects of measurement type transition configurations as described herein, or the processor 1435 and the memory 1425 may be otherwise configured to perform or support such operations.

Figure 15:
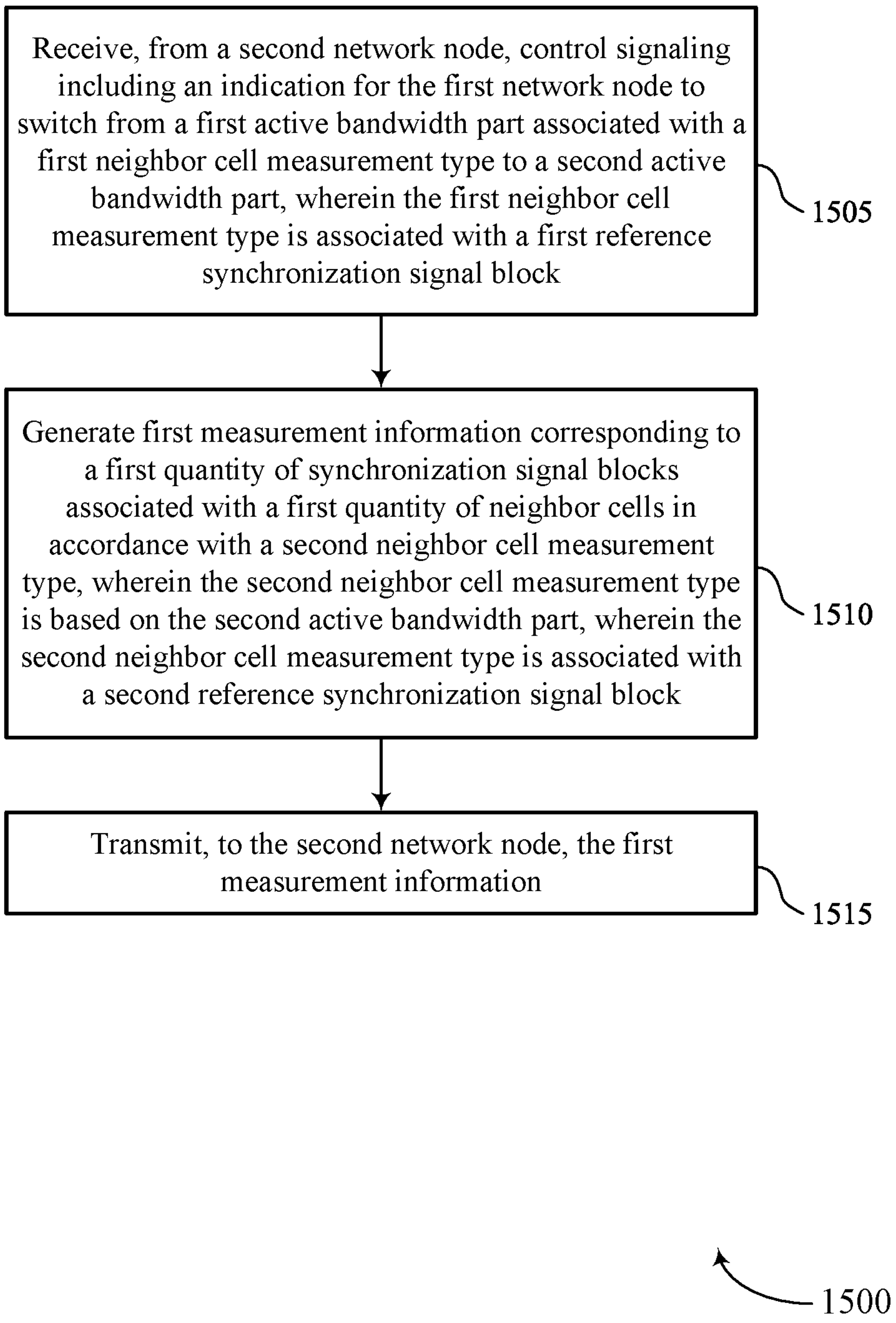
FIGS. 15 through 17 show flowcharts illustrating methods that support measurement type transition configurations in accordance with one or more aspects of the present disclosure.

FIG. 15 shows a flowchart illustrating a method 1500 that supports measurement type transition configurations in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some aspects, a UE may execute a set of instructions to control the functional elements of the UE to perform the described functions. Additionally, or alternatively, the UE may perform aspects of the described functions using special-purpose hardware.

At 1505, the method may include receiving, from a second network node, control signaling including an indication for the first network node to switch from a first active BWP associated with a first neighbor cell measurement type to a second active BWP, where the first neighbor cell measurement type is associated with a first reference SSB. The operations of 1505 may be performed in accordance with examples as disclosed herein. In some aspects, aspects of the operations of 1505 may be performed by an active BWP manager 925 as described with reference to FIG. 9.

At 1510, the method may include generating first measurement information corresponding to a first quantity of SSBs associated with a first quantity of neighbor cells in accordance with a second neighbor cell measurement type, where the second neighbor cell measurement type is based on the second active BWP, where the second neighbor cell measurement type is associated with a second reference SSB. The operations of 1510 may be performed in accordance with examples as disclosed herein. In some aspects, aspects of the operations of 1510 may be performed by a neighbor cell measurement manager 930 as described with reference to FIG. 9.

At 1515, the method may include transmitting, to the second network node, the first measurement information. The operations of 1515 may be performed in accordance with examples as disclosed herein. In some aspects, aspects of the operations of 1515 may be performed by a neighbor cell measurement report manager 935 as described with reference to FIG. 9.

Figure 16:
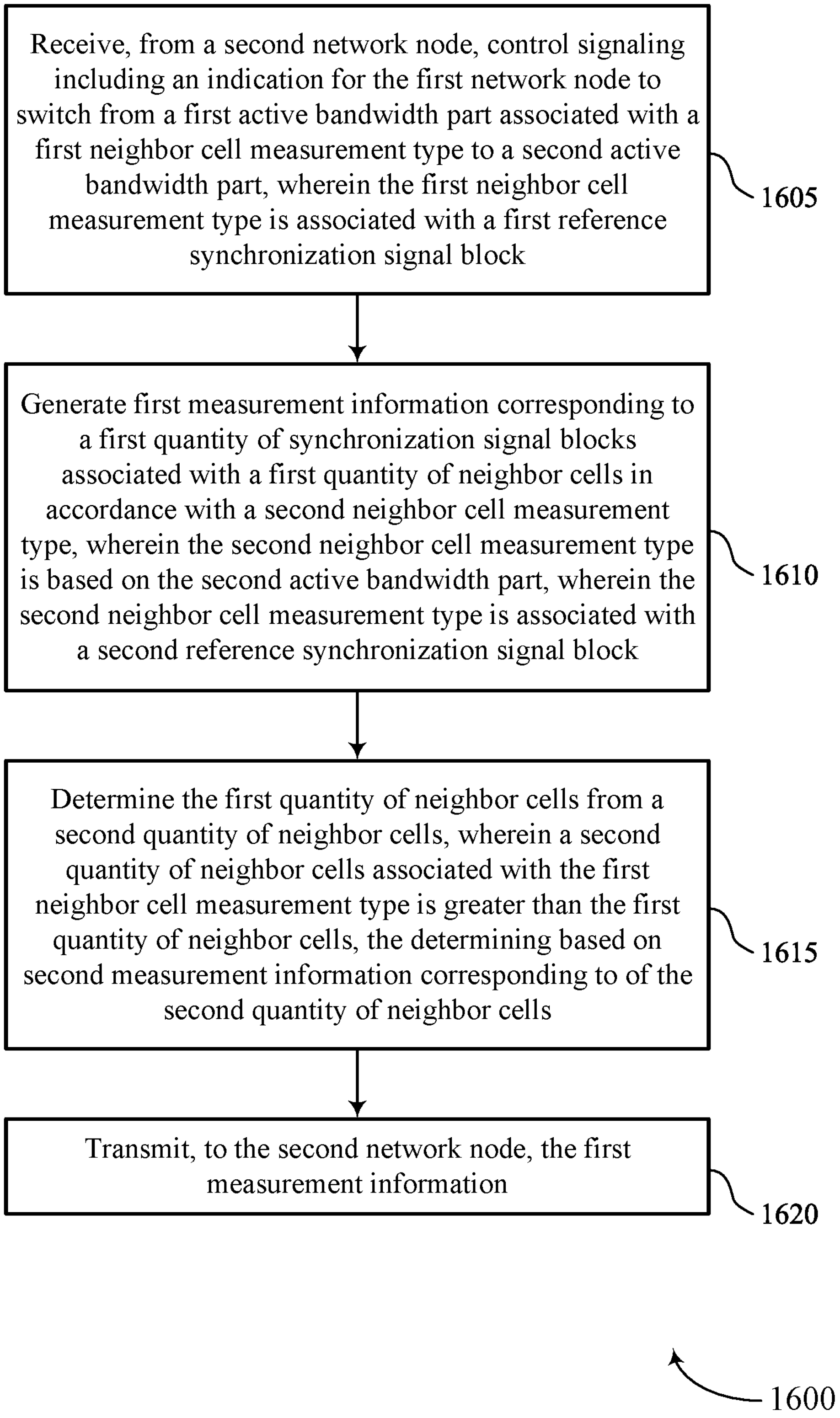

FIG. 16 shows a flowchart illustrating a method 1600 that supports measurement type transition configurations in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some aspects, a UE may execute a set of instructions to control the functional elements of the UE to perform the described functions. Additionally, or alternatively, the UE may perform aspects of the described functions using special-purpose hardware.

At 1605, the method may include receiving, from a second network node, control signaling including an indication for the first network node to switch from a first active BWP associated with a first neighbor cell measurement type to a second active BWP, where the first neighbor cell measurement type is associated with a first reference SSB. The operations of 1605 may be performed in accordance with examples as disclosed herein. In some aspects, aspects of the operations of 1605 may be performed by an active BWP manager 925 as described with reference to FIG. 9.

At 1610, the method may include generating first measurement information corresponding to a first quantity of SSBs associated with a first quantity of neighbor cells in accordance with a second neighbor cell measurement type, where the second neighbor cell measurement type is based on the second active BWP, where the second neighbor cell measurement type is associated with a second reference SSB. The operations of 1610 may be performed in accordance with examples as disclosed herein. In some aspects, aspects of the operations of 1610 may be performed by a neighbor cell measurement manager 930 as described with reference to FIG. 9.

At 1615, the method may include determining the first quantity of neighbor cells from a second quantity of neighbor cells, where a second quantity of neighbor cells associated with the first neighbor cell measurement type is greater than the first quantity of neighbor cells, the determining based on second measurement information corresponding to of the second quantity of neighbor cells. The operations of 1615 may be performed in accordance with examples as disclosed herein. In some aspects, aspects of the operations of 1615 may be performed by an SSB manager 940 as described with reference to FIG. 9.

At 1620, the method may include transmitting, to the second network node, the first measurement information. The operations of 1620 may be performed in accordance with examples as disclosed herein. In some aspects, aspects of the operations of 1620 may be performed by a neighbor cell measurement report manager 935 as described with reference to FIG. 9.

Figure 17:
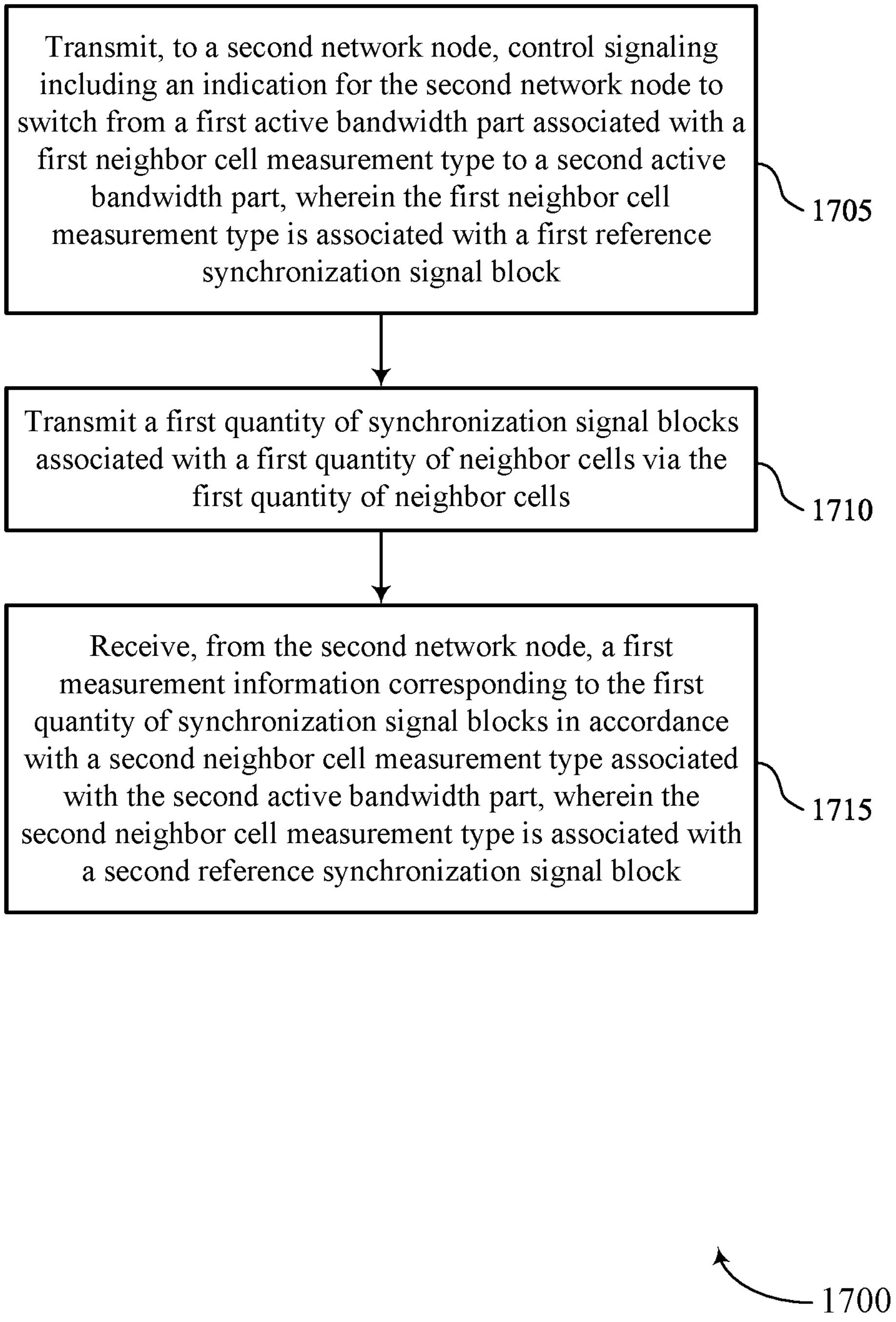

FIG. 17 shows a flowchart illustrating a method 1700 that supports measurement type transition configurations in accordance with one or more aspects of the present disclosure. The operations of the method 1700 may be implemented by a network entity or its components as described herein. For example, the operations of the method 1700 may be performed by a network entity as described with reference to FIGS. 1 through 6 and 11 through 14. In some aspects, a network entity may execute a set of instructions to control the functional elements of the network entity to perform the described functions. Additionally, or alternatively, the network entity may perform aspects of the described functions using special-purpose hardware.

At 1705, the method may include transmitting, to a second network node, control signaling including an indication for the second network node to switch from a first active BWP associated with a first neighbor cell measurement type to a second active BWP, where the first neighbor cell measurement type is associated with a first reference SSB. The operations of 1705 may be performed in accordance with examples as disclosed herein. In some aspects, aspects of the operations of 1705 may be performed by an active BWP manager 1325 as described with reference to FIG. 13.

At 1710, the method may include transmitting a first quantity of SSBs associated with a first quantity of neighbor cells via the first quantity of neighbor cells. The operations of 1710 may be performed in accordance with examples as disclosed herein. In some aspects, aspects of the operations of 1710 may be performed by an SSB manager 1330 as described with reference to FIG. 13.

At 1715, the method may include receiving, from the second network node, a first measurement information corresponding to the first quantity of SSBs in accordance with a second neighbor cell measurement type associated with the second active BWP, where the second neighbor cell measurement type is associated with a second reference SSB. The operations of 1715 may be performed in accordance with examples as disclosed herein. In some aspects, aspects of the operations of 1715 may be performed by a neighbor cell measurement report manager 1335 as described with reference to FIG. 13.

The following provides an overview of aspects of the present disclosure:

Aspect 1: A method for wireless communications at a first network node, comprising: receiving, from a second network node, control signaling including an indication for the first network node to switch from a first active BWP associated with a first neighbor cell measurement type to a second active BWP, wherein the first neighbor cell measurement type is associated with a first reference SSB; generating first measurement information corresponding to a first quantity of SSBs associated with a first quantity of neighbor cells in accordance with a second neighbor cell measurement type, wherein the second neighbor cell measurement type is based on the second active BWP, wherein the second neighbor cell measurement type is associated with a second reference SSB; and transmitting, to the second network node, the first measurement information.

Aspect 2: The method of aspect 1, wherein the first quantity of SSBs and the first quantity of neighbor cells are based on a center frequency of the second reference SSB and a frequency layer associated with the first quantity of SSBs.

Aspect 3: The method of any of aspects 1 through 2, further comprising: determining, the first quantity of neighbor cells from a second quantity of neighbor cells, wherein a second quantity of neighbor cells associated with the first neighbor cell measurement type is greater than the first quantity of neighbor cells, the determining based on second measurement information corresponding to of the second quantity of neighbor cells.

Aspect 4: The method of any of aspects 1 through 3, wherein a second quantity of neighbor cells associated with the first neighbor cell measurement type is greater than the first quantity of neighbor cells, the control signaling includes an indication of cells included in the first quantity of neighbor cells.

Aspect 5: The method of any of aspects 1 through 4, further comprising: determining the first quantity of SSBs independently of a quantity of configured radio link management reference signal SSBs, wherein a center frequency of the second reference SSB is outside of the second active BWP, wherein the SSBs of the first quantity of SSBs have the center frequency.

Aspect 6: The method of any of aspects 1 through 5, further comprising: generating during a period between reception of the control signaling and generation of first measurement information, second measurement information corresponding to a lesser of the first quantity of SSBs or a second quantity of SSBs, wherein the first neighbor cell measurement type is associated with the second quantity of SSBs and a second quantity of neighbor cells, wherein the second neighbor cell measurement type is associated with the first quantity of SSBs and the first quantity of neighbor cells.

Aspect 7: The method of aspect 6, wherein the control signaling includes an indication of the period.

Aspect 8: The method of any of aspects 1 through 7, further comprising: receiving, from the second network node, second control signaling including an indication for the first network node to perform a set of measurements for a first cell in accordance with the first neighbor cell measurement type; generating, prior to reception of the control signaling, second measurement information corresponding to a subset of measurements of the set of measurements in accordance with the first neighbor cell measurement type; and generating, after the reception of the control signaling, third measurement information corresponding to the set of measurements in accordance with the second neighbor cell measurement type.

Aspect 9: The method of aspect 8, wherein generating the first measurement information comprises: generating the first measurement information in accordance with a first delay parameter, wherein the first neighbor cell measurement type is associated with the first delay parameter greater than a second delay parameter associated with the second neighbor cell measurement type Aspect 10: The method of any of aspects 1 through 7, further comprising: receiving, from the second network node, second control signaling including an indication for the first network node to perform a set of measurements for a first cell in accordance with the first neighbor cell measurement type; generating, prior to reception of the control signaling, second measurement information corresponding to a subset of measurements of the set of measurements in accordance with the first neighbor cell measurement type; and generating, after reception of the control signaling, third measurement information corresponding to a remainder of the set of measurements in accordance with the second neighbor cell measurement type.

Aspect 11: A method for wireless communications, comprising: transmitting, to a second network node, control signaling including an indication for the second network node to switch from a first active BWP associated with a first neighbor cell measurement type to a second active BWP, wherein the first neighbor cell measurement type is associated with a first reference SSB; transmitting a first quantity of SSBs associated with a first quantity of neighbor cells via the first quantity of neighbor cells; and receiving, from the second network node, a first measurement information corresponding to the first quantity of SSBs in accordance with a second neighbor cell measurement type associated with the second active BWP, wherein the second neighbor cell measurement type is associated with a second reference SSB.

Aspect 12: The method of aspect 11, wherein the first quantity of SSBs and the first quantity of neighbor cells are based on a center frequency of the second reference SSB and a frequency layer associated with the first quantity of SSBs.

Aspect 13: The method of any of aspects 11 through 12, wherein a second quantity of neighbor cells associated with the first neighbor cell measurement type is greater than the first quantity of neighbor cells, and the control signaling includes an indication of cells included in the first quantity of neighbor cells.

Aspect 14: The method of any of aspects 11 through 13, wherein a center frequency of the second reference SSB is outside of the second active BWP, the SSBs of the first quantity of SSBs have the center frequency, and the first quantity of SSBs is independent of a quantity of configured radio link management reference signal SSBs.

Aspect 15: The method of any of aspects 11 through 14, further comprising: receiving from the second network node, an indication of second measurement information at the second network node during a period between transmission of the control signaling and a generation of the first measurement information at the second network node, wherein the first neighbor cell measurement type is associated with a second quantity of SSBs and a second quantity of neighbor cells, wherein the second neighbor cell measurement type is associated with the first quantity of SSBs and the first quantity of neighbor cells, and wherein the second measurement information corresponds to a lesser of the first quantity of SSBs or the second quantity of SSBs.

Aspect 16: The method of aspect 15, wherein the control signaling includes an indication of the period.

Aspect 17: The method of any of aspects 11 through 16, further comprising: transmitting, to the second network node and prior to the control signaling, second control signaling including an indication for the second network node to perform a set of measurements for a first cell in accordance with the first neighbor cell measurement type; and receiving, from the second network node, second measurement information corresponding to the set of measurements, wherein the set of measurements are associated with the second neighbor cell measurement type.

Aspect 18: The method of aspect 17, wherein the first neighbor cell measurement type is associated with a first delay parameter greater than a second delay parameter associated with the second neighbor cell measurement type, and the set of measurements are associated with the first delay parameter.

Aspect 19: The method of any of aspects 11 through 16, further comprising: transmitting, to the second network node and prior to the control signaling, second control signaling including an indication for the second network node to perform a set of measurements for a first cell in accordance with the first neighbor cell measurement type; and receiving, from the second network node, second measurement information corresponding to the set of measurements, wherein a subset of the set of measurements prior to the control signaling are associated with the first neighbor cell measurement type, and a remainder of the set of measurements are associated with the second neighbor cell measurement type.

Aspect 20: A first network node for wireless communications, comprising a memory and at least one processor coupled to the memory, wherein the at least one processor is configured to perform a method of any of aspects 1 through 10.

Aspect 21: An apparatus for wireless communications at a first network node, comprising at least one means for performing a method of any of aspects 1 through 10.

Aspect 22: A non-transitory computer-readable medium storing code for wireless communications at a first network node, the code comprising instructions executable by a processor to perform a method of any of aspects 1 through 10.

Aspect 23: A first network node for wireless communications, comprising a memory and at least one processor coupled to the memory, wherein the at least one processor is configured to perform a method of any of aspects 11 through 19.

Aspect 24: An apparatus for wireless communications, comprising at least one means for performing a method of any of aspects 11 through 19.

Aspect 25: A non-transitory computer-readable medium storing code for wireless communications, the code comprising instructions executable by a processor to perform a method of any of aspects 11 through 19.

The methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the phrase "a set" shall be construed as including the possibility of a set with one member. That is, the phrase "a set" shall be construed in the same manner as "one or more" or "at least one of."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the examples that may be implemented or that are within the scope of the claims. The term "aspect" or "example" used herein means "serving as an aspect, example, instance, or illustration," and not "preferred" or "advantageous over other aspects." The detailed description includes specific details for the purpose of providing an understanding of the described techniques. These techniques, however, may be practiced without these specific details. In some instances, structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first network entity for wireless communication, comprising:

a memory; and at least one processor coupled to the memory, wherein the at least one processor is configured to:

receive, from a second network entity, control signaling including an indication for the first network entity to switch from a first active bandwidth part associated with a first neighbor cell measurement type to a second active bandwidth part associated with a second neighbor cell measurement type, wherein the first neighbor cell measurement type is associated with a first reference synchronization signal block within the first active bandwidth part and associated with a first delay parameter greater than a second delay parameter associated with the second neighbor cell measurement type;

generate first measurement information corresponding to a first quantity of synchronization signal blocks associated with a first quantity of neighbor cells in accordance with the second neighbor cell measurement type and in accordance with the first delay parameter, wherein the second neighbor cell measurement type is associated with a second reference synchronization signal block within the second active bandwidth part; and transmit, to the second network entity, the first measurement information.

2. The first network entity of claim 1, wherein the first quantity of synchronization signal blocks and the first quantity of neighbor cells are based on a center frequency of the second reference synchronization signal block and a frequency layer associated with the first quantity of synchronization signal blocks.

3. The first network entity of claim 1, wherein a second quantity of neighbor cells associated with the first neighbor cell measurement type is greater than the first quantity of neighbor cells, wherein the at least one processor is configured to:

determine the first quantity of neighbor cells from the second quantity of neighbor cells based on second measurement information corresponding to the second quantity of neighbor cells.

4. The first network entity of claim 1, wherein a second quantity of neighbor cells associated with the first neighbor cell measurement type is greater than the first quantity of neighbor cells, wherein the control signaling includes an indication of cells included in the first quantity of neighbor cells.

5. The first network entity of claim 1, wherein a center frequency of the second reference synchronization signal block is outside of the second active bandwidth part, wherein the synchronization signal blocks of the first quantity of synchronization signal blocks have the center frequency, and wherein the at least one processor is configured to:

determine the first quantity of synchronization signal blocks independently of a quantity of configured radio link management reference signal synchronization signal blocks.

6. The first network entity of claim 1, wherein the first neighbor cell measurement type is associated with a second quantity of synchronization signal blocks and a second quantity of neighbor cells, wherein the second neighbor cell measurement type is associated with the first quantity of synchronization signal blocks and the first quantity of neighbor cells, and wherein the at least one processor is configured to:

generate, during a period between reception of the control signaling and generation of first measurement information, second measurement information corresponding to a lesser of the first quantity of synchronization signal blocks or the second quantity of synchronization signal blocks.

7. The first network entity of claim 6, wherein the control signaling includes an indication of the period.

8. The first network entity of claim 1, wherein the at least one processor is configured to:

receive, from the second network entity, second control signaling including an indication for the first network entity to perform a set of measurements for a first cell in accordance with the first neighbor cell measurement type;

generate, prior to reception of the control signaling, second measurement information corresponding to a subset of measurements of the set of measurements in accordance with the first neighbor cell measurement type; and generate, after the reception of the control signaling, third measurement information corresponding to the set of measurements in accordance with the second neighbor cell measurement type.

9. The first network entity of claim 1, wherein the at least one processor is configured to:

receive, from the second network entity, second control signaling including an indication for the first network entity to perform a set of measurements for a first cell in accordance with the first neighbor cell measurement type;

generate, prior to reception of the control signaling, second measurement information corresponding to a subset of measurements of the set of measurements in accordance with the first neighbor cell measurement type; and generate, after reception of the control signaling, third measurement information corresponding to a remainder of the set of measurements in accordance with the second neighbor cell measurement type.

10. A first network entity for wireless communication, comprising:

a memory; and at least one processor coupled to the memory, wherein the at least one processor is configured to:

transmit, to a second network entity, control signaling including an indication for the second network entity to switch from a first active bandwidth part associated with a first neighbor cell measurement type to a second active bandwidth part associated with a second neighbor cell measurement type, wherein the first neighbor cell measurement type is associated with a first reference synchronization signal block within the first active bandwidth part and associated with a first delay parameter greater than a second delay parameter associated with the second neighbor cell measurement type;

transmit a first quantity of synchronization signal blocks associated with a first quantity of neighbor cells via the first quantity of neighbor cells; and receive, from the second network entity, a first measurement information corresponding to the first quantity of synchronization signal blocks in accordance with the second neighbor cell measurement type, the first delay parameter, and the control signaling, wherein the second neighbor cell measurement type is associated with a second reference synchronization signal block within the second active bandwidth part.

11. The first network entity of claim 10, wherein the first quantity of synchronization signal blocks and the first quantity of neighbor cells are based on a center frequency of the second reference synchronization signal block and a frequency layer associated with the first quantity of synchronization signal blocks.

12. The first network entity of claim 10, wherein a second quantity of neighbor cells associated with the first neighbor cell measurement type is greater than the first quantity of neighbor cells, and wherein the control signaling includes an indication of cells included in the first quantity of neighbor cells.

13. The first network entity of claim 10, wherein a center frequency of the second reference synchronization signal block is outside of the second active bandwidth part, wherein the synchronization signal blocks of the first quantity of synchronization signal blocks have the center frequency, and wherein the first quantity of synchronization signal blocks is independent of a quantity of configured radio link management reference signal synchronization signal blocks.

14. The first network entity of claim 10, wherein the first neighbor cell measurement type is associated with a second quantity of synchronization signal blocks and a second quantity of neighbor cells, wherein the second neighbor cell measurement type is associated with the first quantity of synchronization signal blocks and the first quantity of neighbor cells, and wherein the at least one processor is configured to:

receive, from the second network entity, an indication of second measurement information at the second network entity during a period between transmission of the control signaling and a generation of the first measurement information at the second network entity, the second measurement information corresponding to a lesser of the first quantity of synchronization signal blocks or the second quantity of synchronization signal blocks.

15. The first network entity of claim 14, wherein the control signaling includes an indication of the period.

16. The first network entity of claim 10, wherein the at least one processor is configured to:

transmit, to the second network entity and prior to the control signaling, second control signaling including an indication for the second network entity to perform a set of measurements for a first cell in accordance with the first neighbor cell measurement type; and receive, from the second network entity, second measurement information corresponding to the set of measurements, wherein the set of measurements are associated with the second neighbor cell measurement type.

17. The first network entity of claim 10, wherein the at least one processor is configured to:

transmit, to the second network entity and prior to the control signaling, second control signaling including an indication for the second network entity to perform a set of measurements for a first cell in accordance with the first neighbor cell measurement type; and receive, from the second network entity, second measurement information corresponding to the set of measurements, wherein a subset of the set of measurements prior to the control signaling are associated with the first neighbor cell measurement type, and a remainder of the set of measurements are associated with the second neighbor cell measurement type.

18. A method for wireless communications performed by a first network entity, comprising:

receiving, from a second network entity, control signaling including an indication for the first network entity to switch from a first active bandwidth part associated with a first neighbor cell measurement type to a second active bandwidth part associated with a second neighbor cell measurement type, wherein the first neighbor cell measurement type is associated with a first reference synchronization signal block within the first active bandwidth part and associated with a first delay parameter greater than a second delay parameter associated with the second neighbor cell measurement type;

generating first measurement information corresponding to a first quantity of synchronization signal blocks associated with a first quantity of neighbor cells in accordance with a second neighbor cell measurement type and in accordance with the first delay parameter, wherein the second neighbor cell measurement type is associated with a second reference synchronization signal block within the second active bandwidth part; and transmitting, to the second network entity, the first measurement information.

19. The method of claim 18, wherein the first quantity of synchronization signal blocks and the first quantity of neighbor cells are based on a center frequency of the second reference synchronization signal block and a frequency layer associated with the first quantity of synchronization signal blocks.

20. The method of claim 18, further comprising:

determining the first quantity of neighbor cells from a second quantity of neighbor cells, wherein a second quantity of neighbor cells associated with the first neighbor cell measurement type is greater than the first quantity of neighbor cells, the determining based on second measurement information corresponding to the second quantity of neighbor cells.

21. The method of claim 18, wherein a second quantity of neighbor cells associated with the first neighbor cell measurement type is greater than the first quantity of neighbor cells, and wherein the control signaling includes an indication of cells included in the first quantity of neighbor cells.

22. The method of claim 18, further comprising:

determining the first quantity of synchronization signal blocks independently of a quantity of configured radio link management reference signal synchronization signal blocks, wherein a center frequency of the second reference synchronization signal block is outside of the second active bandwidth part, wherein the synchronization signal blocks of the first quantity of synchronization signal blocks have the center frequency.

23. The method of claim 18, further comprising:

generating during a period between reception of the control signaling and generation of first measurement information, second measurement information corresponding to a lesser of the first quantity of synchronization signal blocks or a second quantity of synchronization signal blocks, wherein the first neighbor cell measurement type is associated with the second quantity of synchronization signal blocks and a second quantity of neighbor cells, wherein the second neighbor cell measurement type is associated with the first quantity of synchronization signal blocks and the first quantity of neighbor cells.

24. The method of claim 23, wherein the control signaling includes an indication of the period.

25. The method of claim 18, further comprising:

receiving, from the second network entity, second control signaling including an indication for the first network entity to perform a set of measurements for a first cell in accordance with the first neighbor cell measurement type;

generating, prior to reception of the control signaling, second measurement information corresponding to a subset of measurements of the set of measurements in accordance with the first neighbor cell measurement type; and generating, after the reception of the control signaling, third measurement information corresponding to the set of measurements in accordance with the second neighbor cell measurement type.

26. The method of claim 18, further comprising:

receiving, from the second network entity, second control signaling including an indication for the first network entity to perform a set of measurements for a first cell in accordance with the first neighbor cell measurement type;

generating, prior to reception of the control signaling, second measurement information corresponding to a subset of measurements of the set of measurements in accordance with the first neighbor cell measurement type; and generating, after reception of the control signaling, third measurement information corresponding to a remainder of the set of measurements in accordance with the second neighbor cell measurement type.

27. A method for wireless communications performed by a first network entity, comprising:

transmitting, to a second network entity, control signaling including an indication for the second network entity to switch from a first active bandwidth part associated with a first neighbor cell measurement type to a second active bandwidth part associated with a second neighbor cell measurement type, wherein the first neighbor cell measurement type is associated with a first reference synchronization signal block within the first active bandwidth part and associated with a first delay parameter greater than a second delay parameter associated with the second neighbor cell measurement type;

transmitting a first quantity of synchronization signal blocks associated with a first quantity of neighbor cells via the first quantity of neighbor cells; and receiving, from the second network entity, a first measurement information corresponding to the first quantity of synchronization signal blocks in accordance with the second neighbor cell measurement type, the first delay parameter, and the control signaling, wherein the second neighbor cell measurement type is associated with a second reference synchronization signal block within the second active bandwidth part.

* * * * *